US011288623B2

(12) United States Patent
Gillen

(10) Patent No.: US 11,288,623 B2
(45) Date of Patent: *Mar. 29, 2022

(54) CONCEPTS FOR USING ACTION IDENTIFIERS IN MESSAGES

(71) Applicant: United Parcel Service of America, Inc., Atlanta, GA (US)

(72) Inventor: Robert J. Gillen, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,369

(22) Filed: Nov. 16, 2020

(65) Prior Publication Data
US 2021/0073730 A1    Mar. 11, 2021

Related U.S. Application Data

(63) Continuation of application No. 16/264,124, filed on Jan. 31, 2019, now Pat. No. 10,839,342, which is a continuation of application No. 14/477,496, filed on Sep. 4, 2014, now Pat. No. 10,223,664.

(60) Provisional application No. 62/005,278, filed on May 30, 2014.

(51) Int. Cl.
G06Q 30/00 (2012.01)
G06Q 10/08 (2012.01)
G06Q 30/02 (2012.01)
H04L 51/18 (2022.01)
G06Q 30/06 (2012.01)

(52) U.S. Cl.
CPC ..... *G06Q 10/0838* (2013.01); *G06Q 30/0277* (2013.01); *G06Q 30/0635* (2013.01); *H04L 51/18* (2013.01)

(58) Field of Classification Search
CPC .......... G06Q 10/0838; G06Q 30/0277; G06Q 30/0635; H04L 51/18
USPC ...................................................... 705/26, 27
See application file for complete search history.

(56) References Cited

U.S. PATENT DOCUMENTS

| 8,010,463 | B2 | 8/2011 | Gillen |
| 8,271,394 | B1 | 9/2012 | Bogaard |
| 8,577,401 | B1 | 11/2013 | Osinga |
| 8,712,922 | B2 | 4/2014 | Kadaba |
| 8,712,923 | B2 | 4/2014 | Kadaba |

(Continued)

OTHER PUBLICATIONS

Ballve, Marcelo, "Messaging Apps Will Soon Be Bigger Than Linkedin, Twitter, Facebook, And Instagram Combined", Business Insider, Retrieved from Internet: <http://www.businessinsider.com/messaging-apps-willsoon-be-bigger-than-social-networks-2014-7#ixzz3Ks8pPtYk>, Jul. 31, 2014, 2 pages.

(Continued)

*Primary Examiner* — Robert M Pond
(74) *Attorney, Agent, or Firm* — Shook, Hardy & Bacon L.L.P.

(57) ABSTRACT

Computer program products, methods, systems, apparatus, and computing entities are provided for automatically carrying out actions based on action identifiers in messages. In one embodiment, an appropriate computing entity can determine whether a message comprises an action identifier in the message. If the message comprises an action identifier, one or more of the parties of message can be identified and the corresponding action can be initiated.

20 Claims, 32 Drawing Sheets

(56) References Cited

U.S. PATENT DOCUMENTS

| | | |
|---|---|---|
| 9,123,069 B1 | 9/2015 | Haynes et al. |
| 9,916,557 B1 | 3/2018 | Gillen et al. |
| 10,198,764 B2 | 2/2019 | Nihalani et al. |
| 10,223,664 B2 * | 3/2019 | Gillen ............ G06Q 10/0838 |
| 10,839,342 B2 * | 11/2020 | Gillen ............ G06Q 10/0838 |
| 2002/0123940 A1 | 9/2002 | Spets |
| 2008/0147514 A1 | 6/2008 | Shuster et al. |
| 2008/0222030 A1 | 9/2008 | Fischler |
| 2009/0076918 A1 | 3/2009 | Blanchet |
| 2010/0262453 A1 | 10/2010 | Robinson et al. |
| 2012/0158580 A1 | 6/2012 | Eram et al. |
| 2012/0158589 A1 | 6/2012 | Katzin et al. |
| 2013/0024525 A1 | 1/2013 | Brady et al. |
| 2013/0110635 A1 | 5/2013 | Clift et al. |
| 2013/0110679 A1 | 5/2013 | Spadafora et al. |
| 2013/0198300 A1 | 8/2013 | Briggman et al. |
| 2013/0254068 A1 | 9/2013 | Scipioni et al. |
| 2013/0297435 A1 | 11/2013 | Prellwitz et al. |
| 2013/0325669 A1 | 12/2013 | Plichta et al. |
| 2014/0075580 A1 | 3/2014 | Santosh et al. |
| 2014/0136346 A1 | 5/2014 | Teso |
| 2014/0180959 A1 | 6/2014 | Gillen et al. |
| 2014/0278875 A1 | 9/2014 | Ganesh et al. |
| 2014/0279667 A1 | 9/2014 | Gillen |
| 2015/0066795 A1 | 3/2015 | Gillen et al. |
| 2015/0066798 A1 | 3/2015 | Gillen et al. |
| 2015/0081343 A1 | 3/2015 | Streebin |
| 2015/0154559 A1 | 6/2015 | Barbush et al. |
| 2015/0347961 A1 | 12/2015 | Gillen |
| 2019/0236544 A1 | 8/2019 | Gillen |

OTHER PUBLICATIONS

Choudary, Sangeet Paul, "Why A Stupid App Like Yo May Have Billion-Dollar Platform Potential", TechCrunch, Retrieved from Internet: <http://techcrunch.com/2014/07/26/why-a-stupid-app-like-yo-may-havebillion-dollar-platform-potentiaV>, Jul. 26, 2014, 16 pages.

"Emerging Markets Drive Twitter User Growth Worldwide: More than 40% of Twitter Users Worldwide will be in Asia-Pacific by 2018", eMarketer, Retrieved from Internet: <http://www.emarketer.com/Article/Emerging-Markets-Drive-Twitter-User-Growth-Worldwide/1010874>, May 27, 2014, 3 pages.

Fiegerman, Seth, "Report: U.S. Mobile Commerce to Hit $114 Billion This Year", Mashable, Retrieved from Internet: <http://mashable.com/2014/05/12/mobile-commerce-sales/>, May 12, 2014, 7 pages.

Gamble, Richard H., "No Cash for Coffee?", Credit Union Management 34.11: 14-15,17-18. Credit Union Executives Society, Nov. 2011, 8 pages.

Isaac et al., "With Revenue Roaring, Twitter's Advertising Team Is Untouched by Turmoil", New York Times Blog, Retrieved from Internet: <http://bits.blogs.nytimes.com/2014/07/06/with-revenue-roaring-twittersadvertising-team-is-unscathed-by-turmoil>, Jul. 6, 2014, 3 pages.

Lomas, Natasha, "Amazon Extends Its Shopping Cart To Twitter", TechCrunch, Retrieved from Internet: <http://techcrunch.com/2014/05/05/amazon-extends-its-shopping-cart-to-twitter/>, May 5, 2014, 9 pages.

Lomas, Natasha, "Yo, The One-Word Messaging App, Updates So It's Not Quite So Absurdly Simple Anymore", TechCrunch, Retrieved from Internet: <http://techcrunch.com/2014/08/12/yo-grows-up/>, Aug. 12, 2014, 14 pages.

Nuckles, Brett, "'Buy Button' Could Make Twitter Your New Storefront", Business News Daily, Retrieved from Internet: <www.businessnewsdaily.com/5866-buy-button-twitter-storefront-small-businesscommerce.html>, Feb. 3, 2014, 1 pages.

Perez, Sarah, "Soldsie, The Service That Lets You Shop Via Facebook And Instagram", TechCrunch, Retrieved from Internet: <http://techcrunch.com/2014/05/15/soldsie-the-service-that-letsyou-shop-via-facebook-and-instagram-comments-raises-4-million/>. May 15, 2014, 10 pages.

Perez, Sarah, "Twitter Is Experimenting With A New Way To Retweet", TechCrunch, Retrieved from Internet: <http://techcrunch.com/2014/06/24/twitter-is-experimenting-with-a-new-way-to-retweet/>, Jun. 24, 2014, 10 pages.

Siwicki, Bill, "Mobile Commerce Sales are Up 101% in Q1 for 350 Retailers", internetRETAILER®, Retrieved from Internet: <https://www.internetretailer.com/2014/04/15/mobile-commerce-sales-are-101-q1-350-retailers>, Apr. 15, 2014, 3 pages.

Smith, Oliver, "Amazon Teams Up With Twitter to Launch Tweet-to-Buy Service", City A.M., Retrieved from Internet: <http://www.cityam.com/article/1399349431/amazon-teams-twitter-launch-tweet-buy-service>, May 6, 2014, 9 pages.

Soper, Taylor, "E-Commerce Meets Social: Amazon Racks Up 157K #AmazonCart Tweets in 2 Weeks", GeekWire, Retrieved from Internet: <http://www.geekwire.com/2014/amazoncart-tweet/>, May 19, 2014, 6 pages.

Sullivan, Danny, "Up Close: Tweeting Hashtags To Buy Things On Twitter With American Express,", Marketing Land, Retrieved from Internet: <http://marketingland.com/upclose-buying-things-on-twitter-with-american-express-33390>, Feb. 13, 2013, 7 pages.

Wagner, Kurt, "Twitter 'Buy Now' Button Appears for First Time", Mashable, Retrieved from Internet: <http://mashable.com/2014/06/30/twitter-buy-now-button/>, Jun. 30, 2014, 14 pages.

Zimmerman,Eilene, "Why More Start-Ups Are Sharing Ideas Without Legal Protection", The New York Times, Retrieved from Internet:<http://www.nytimes.com/2014/07/03/business/smallbusiness/why-more-startups-are-sharing-ideas-without-getting-legal-protection.html>, Jul. 2, 2014, 4 pages.

* cited by examiner

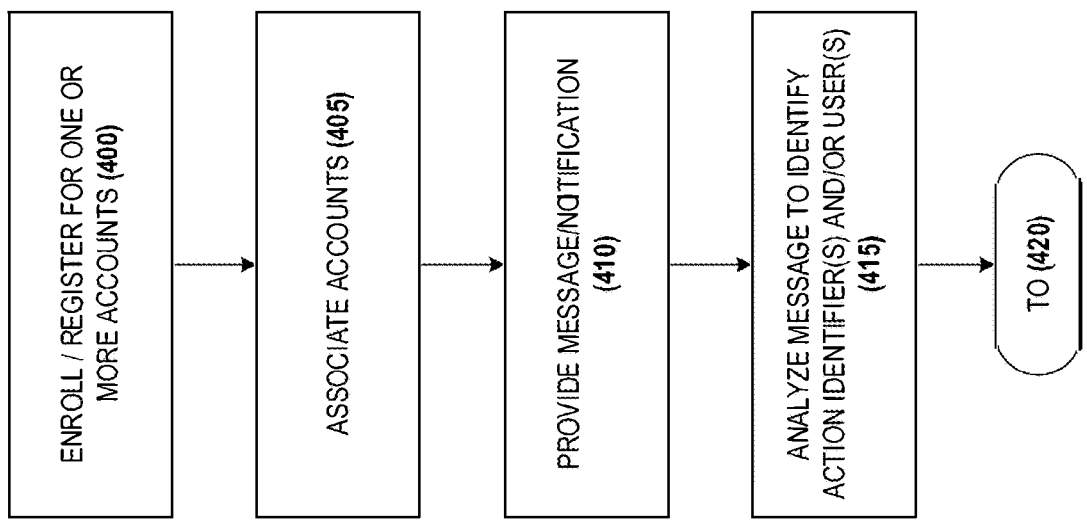

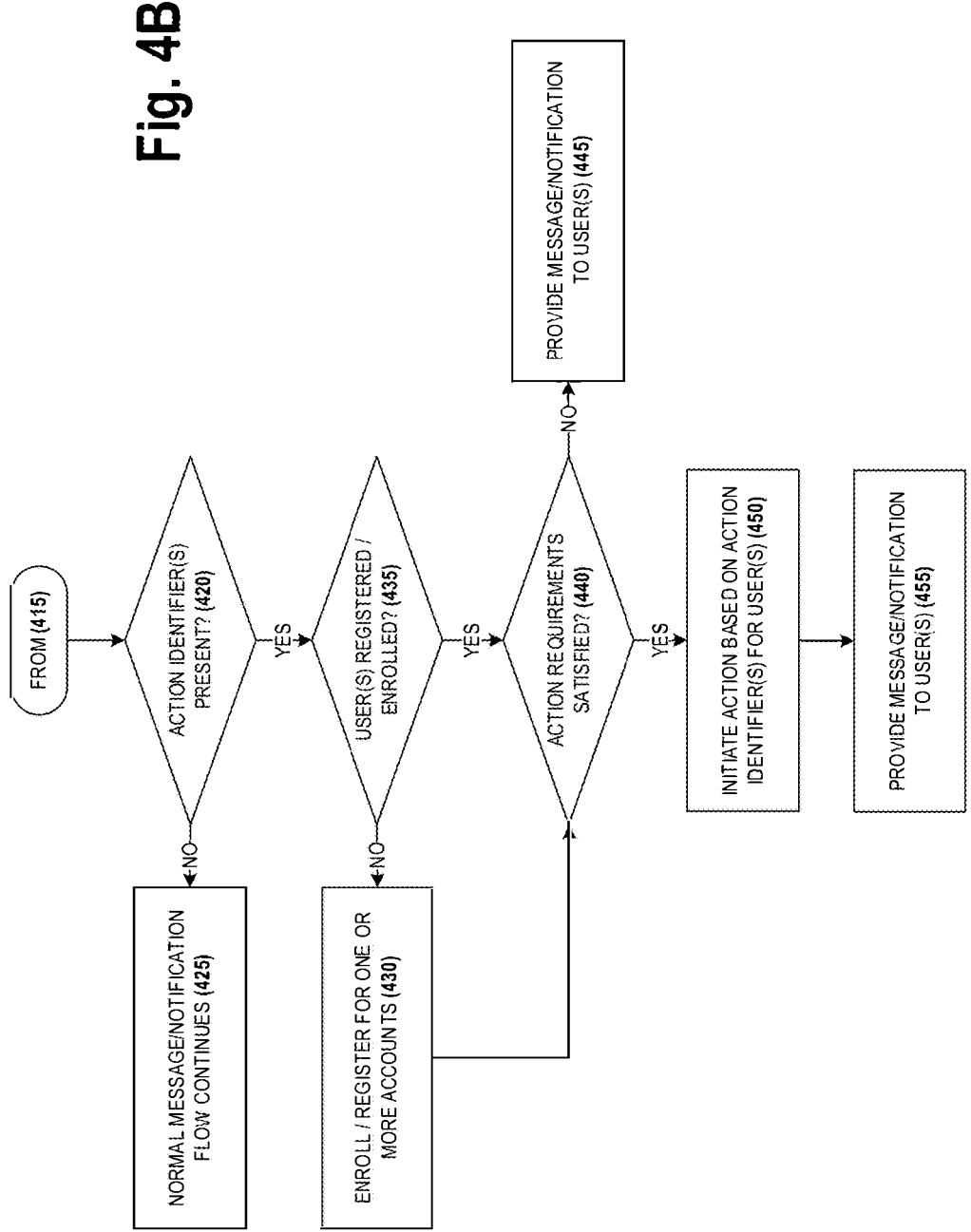

Join Twitter today.

Full name

[                    ] Enter your first and last name.

Email address

[                    ]

Create a password

[                    ]

Choose your username

[                    ]

☑ Keep me signed-in on this computer.

☑ Tailor Twitter based on my recent website visits. Learn more.

By clicking the button, you agree to the terms below:

These Terms of Service ("Terms") govern your access to and use of the services, including our various websites, SMS, APIs, email notifications, Printable versions:
Terms of Service - Privacy Policy -
Cookie Use

[ Create my account ]

Note: Others will be able to find you by name, username or email. Your email will not be shown publicly. You can change your privacy settings at any time.

Fig. 10

| Twitter Profile | |
|---|---|
| User ID | @JohnDoe899 |
| Twitter User ID | ******* |
| Email Address | john.doe49@mail.com |
| Location | Seattle, Washington |
| Website | www.johndoe.com |

| Facebook Credentials | |
|---|---|
| User ID | johndoe7 |
| Password | ********** |

| UPS My Choice Credentials | |
|---|---|
| User ID | JohnDoe899 |
| Password | ******* |

| Verizon Messaging Credentials | |
|---|---|
| User ID | 555.888.1212 |
| Password | ***** |

| Action Identifier | Action |
|---|---|
| #Track | Track identified item |
| #TrackUPS | Track identified item w/ UPS |
| #TrackCarrierName | Track identified item w/ identified carrier |
| #Ship | Ship identified item |
| #ShipUPS | Ship identified item w/ UPS |
| #ShipCarrierName | Ship identified item w/ identified carrier |
| #PayShip | Pay for and ship identified item |
| #PayShipUPS | Pay for and ship identified item w/ UPS |
| #PayShipCarrierName | Pay for and ship identified item w/ identified carrier |
| #SocialBuy | Pay for identified item using social buying rules |
| #SocialBuyUPS | Pay for and ship identified item using social buying rules |
| #SocialBuyRetailerName | Pay for and ship identified item w/ identified carrier using social buying rules |
| #GroupBuy | Pay for identified item using group buying rules |
| #GroupBuyUPS | Pay for and ship identified item using group buying rules |
| #GroupBuyRetailerName | Pay for and ship identified item w/ identified carrier using group buying rules |
| #UPSPackage | Provide status of identified item |
| #UPSDriver | Provide status of driver delivering item |
| #UPSVehicle | Provide location of driver delivering item |
| #UPSCar | Provide location of car delivering item |
| #UPSNDA | Change delivery service level of identified item to Next Day Air |
| #UPS2DA | Change delivery service level of identified item to Second Day Air |
| #UPSGND | Change delivery service level of identified item to Ground |
| #UPSHold | Hold identified item from delivery |
| #UPSRedelivery | Redeliver identified item on next available delivery day |
| #Advertisment | Provide advertisement |
| #Geo | Trigger group buying, group delivery, social network delivery, etc. |

Fig. 11

| Action Identifier | Action |
|---|---|
| *Track | Track identified item |
| *TrackUPS | Track identified item w/ UPS |
| *TrackCarrierName | Track identified item w/ identified carrier |
| //Ship | Ship identified item |
| //ShipUPS | Ship identified item w/ UPS |
| //ShipCarrierName | Ship identified item w/ identified carrier |
| $$PayShip | Pay for and ship identified item |
| $$PayShipUPS | Pay for and ship identified item w/ UPS |
| $$PayShipCarrierName | Pay for and ship identified item w/ identified carrier |
| *SocialBuy | Pay for identified item using social buying rules |
| *SocialBuyUPS | Pay for and ship identified item w/ identified carrier using social buying rules |
| *SocialBuyRetailerName | Pay for and ship identified item w/ identified carrier using social buying rules |
| *GroupBuy | Pay for identified item using group buying rules |
| *GroupBuyUPS | Pay for and ship identified item using group buying rules |
| *GroupBuyRetailerName | Pay for and ship identified item w/ identified carrier using group buying rules |
| *UPSPackage | Provide status of identified item |
| *UPSDriver | Provide status of driver delivering item |
| *UPSVehicle | Provide location of vehicle delivering item |
| *UPSCar | Provide location of car delivering item |
| *UPSNDA | Change delivery service level of identified item to Next Day Air |
| *UPS2DA | Change delivery service level of identified item to Second Day Air |
| *UPSGND | Change delivery service level of identified item to Ground |
| *UPSHold | Hold identified item from delivery |
| *UPSRedelivery | Redeliver identified item on next available delivery day |
| #Advertisement | Provide advertisement |
| #Geo | Trigger group buying, group delivery, social network delivery, etc. |

Fig. 12

Fig. 13A
| Action Identifier | Action |
|---|---|
| t | Track identified item |
| ¤ | Ship identified item |
| ■ | Pay for and ship identified item |
Fig. 13B
| Action Identifier | Action |
|---|---|
|  | Track identified item |
|  | Ship identified item |
|  | Pay for and ship identified item |

Fig. 27

```xml
<?xml version="1.0" encoding="utf-8"?>
<Purchase>
  <Buyer>
    <BuyerTwitterID>@JohnDoe899</BuyerTwitterID>
    <BuyerTwitterPW>*********</BuyerTwitterPW>
    <BuyerUPSID>JohnDoe899</BuyerUPSID>
    <BuyerUPSPW>*********</BuyerUPSPW>
  </Buyer>
  <Seller>
    <SellerTwitterID>@XYZCo</SellerTwitterID>
    <SellerUPSID>JohnDoe899</SellerUPSID>
  </Seller>
  <PurchaseDetails>
    <ItemNo>159184455X</ItemNo>
    <ItemPrice>$34.99USD</ItemPrice>
    <OrderNo>179FH87</OrderNo>
    <Time>2014-11-09 T 11:20:35 UTC</Time>
  <PurchaseDetails>
</Purchase>
```

CONCEPTS FOR USING ACTION IDENTIFIERS IN MESSAGES

CROSS-REFERENCE TO RELATED APPLICATIONS

This application is a continuation of and claims priority to U.S. application Ser. No. 16/264,124, filed Jan. 31, 2019, entitled "Concepts for Using Action Identifiers in Messages," which is a continuation of and claims priority to U.S. application Ser. No. 14/477,496, filed Sep. 4, 2014, entitled "Concepts for Using Action Identifiers in Messages" (now U.S. Pat. No. 10,223,664), which claims priority to U.S. Provisional Application No. 62/005,278, filed May 30, 2014, entitled "Customer Controlled Management of Shipments," all of which are hereby incorporated herein by reference in their entireties.

BACKGROUND

With the explosion of mobile devices, social media, and other forms of electronic communication, there is a need for new approaches for controlling the shipment of items, conducting the purchase of items, and performing other actions as desired by users.

BRIEF SUMMARY

In general, embodiments of the present invention provide methods, apparatus, systems, computing devices, computing entities, and/or the like.

In accordance with one aspect, a method is provided. In one embodiment, the method comprises (1) determining whether an electronic message from a sender to an intended recipient comprises an action identifier in the electronic message, the action identifier initiating the generation of a shipping record for an item to be sent from the sender to the intended recipient; (2) responsive to determining that the electronic message comprises the action identifier in the electronic message, determining (a) the identity of the sender and the intended recipient of the item based at least in part on the electronic message and (b) a physical address of the intended recipient of the item based at least in part on the electronic message; and (3) automatically initiating generation of a shipping record for the item, the shipping record identifying (a) the sender of the item, (b) the recipient of the item, and (b) the physical address of the intended recipient of the item.

In accordance with another aspect, a computer program product is provided. The computer program product may comprise at least one computer-readable storage medium having computer-readable program code portions stored therein, the computer-readable program code portions comprising executable portions configured to (1) determine whether an electronic message from a sender to an intended recipient comprises an action identifier in the electronic message, the action identifier initiating the generation of a shipping record for an item to be sent from the sender to the intended recipient; (2) responsive to determining that the electronic message comprises the action identifier in the electronic message, determine (a) the identity of the sender and the intended recipient of the item based at least in part on the electronic message and (b) a physical address of the intended recipient of the item based at least in part on the electronic message; and (3) automatically initiate generation of a shipping record for the item, the shipping record identifying (a) the sender of the item, (b) the recipient of the item, and (b) the physical address of the intended recipient of the item.

In accordance with yet another aspect, an apparatus comprising at least one processor and at least one memory including computer program code is provided. In one embodiment, the at least one memory and the computer program code may be configured to, with the processor, cause the apparatus to (1) determine whether an electronic message from a sender to an intended recipient comprises an action identifier in the electronic message, the action identifier initiating the generation of a shipping record for an item to be sent from the sender to the intended recipient; (2) responsive to determining that the electronic message comprises the action identifier in the electronic message, determine (a) the identity of the sender and the intended recipient of the item based at least in part on the electronic message and (b) a physical address of the intended recipient of the item based at least in part on the electronic message; and (3) automatically initiate generation of a shipping record for the item, the shipping record identifying (a) the sender of the item, (b) the recipient of the item, and (b) the physical address of the intended recipient of the item.

In accordance with one aspect, a method is provided. In one embodiment, the method comprises (1) determining whether an electronic message from a purchasing party comprises an action identifier in the electronic message, the action identifier initiating (a) the purchase of an item by the purchasing party and (b) the generation of a shipping record for the item; (2) responsive to determining that the electronic message from the purchasing party comprises the action identifier in the electronic message, determining (a) the identity of the purchasing party based at least in part on the electronic message, (b) the item being purchased based at least in part on the electronic message, and (c) a physical address of the purchasing party based at least in part on the electronic message; and (3) automatically initiating (a) the purchase of the item for the purchasing party and (b) the generation of a shipping record for the item, the shipping record identifying the purchasing party of the item and the physical address of the purchasing party.

In accordance with another aspect, a computer program product is provided. The computer program product may comprise at least one computer-readable storage medium having computer-readable program code portions stored therein, the computer-readable program code portions comprising executable portions configured to (1) determine whether an electronic message from a purchasing party comprises an action identifier in the electronic message, the action identifier initiating (a) the purchase of an item by the purchasing party and (b) the generation of a shipping record for the item; (2) responsive to determining that the electronic message from the purchasing party comprises the action identifier in the electronic message, determine (a) the identity of the purchasing party based at least in part on the electronic message, (b) the item being purchased based at least in part on the electronic message, and (c) a physical address of the purchasing party based at least in part on the electronic message; and (3) automatically initiate (a) the purchase of the item for the purchasing party and (b) the generation of a shipping record for the item, the shipping record identifying the purchasing party of the item and the physical address of the purchasing party.

In accordance with yet another aspect, an apparatus comprising at least one processor and at least one memory including computer program code is provided. In one embodiment, the at least one memory and the computer program code may be configured to, with the processor, cause the apparatus to (1) determine whether an electronic message from a purchasing party comprises an action identifier in the electronic message, the action identifier initiating (a) the purchase of an item by the purchasing party and (b) the generation of a shipping record for the item; (2) responsive to determining that the electronic message from the purchasing party comprises the action identifier in the electronic message, determine (a) the identity of the purchasing party based at least in part on the electronic message, (b) the item being purchased based at least in part on the electronic message, and (c) a physical address of the purchasing party based at least in part on the electronic message; and (3) automatically initiate (a) the purchase of the item for the purchasing party and (b) the generation of a shipping record for the item, the shipping record identifying the purchasing party of the item and the physical address of the purchasing party.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4A and 4B are flowcharts illustrating operations and processes that can be used in accordance with various embodiments of the present invention.

Figure 1:
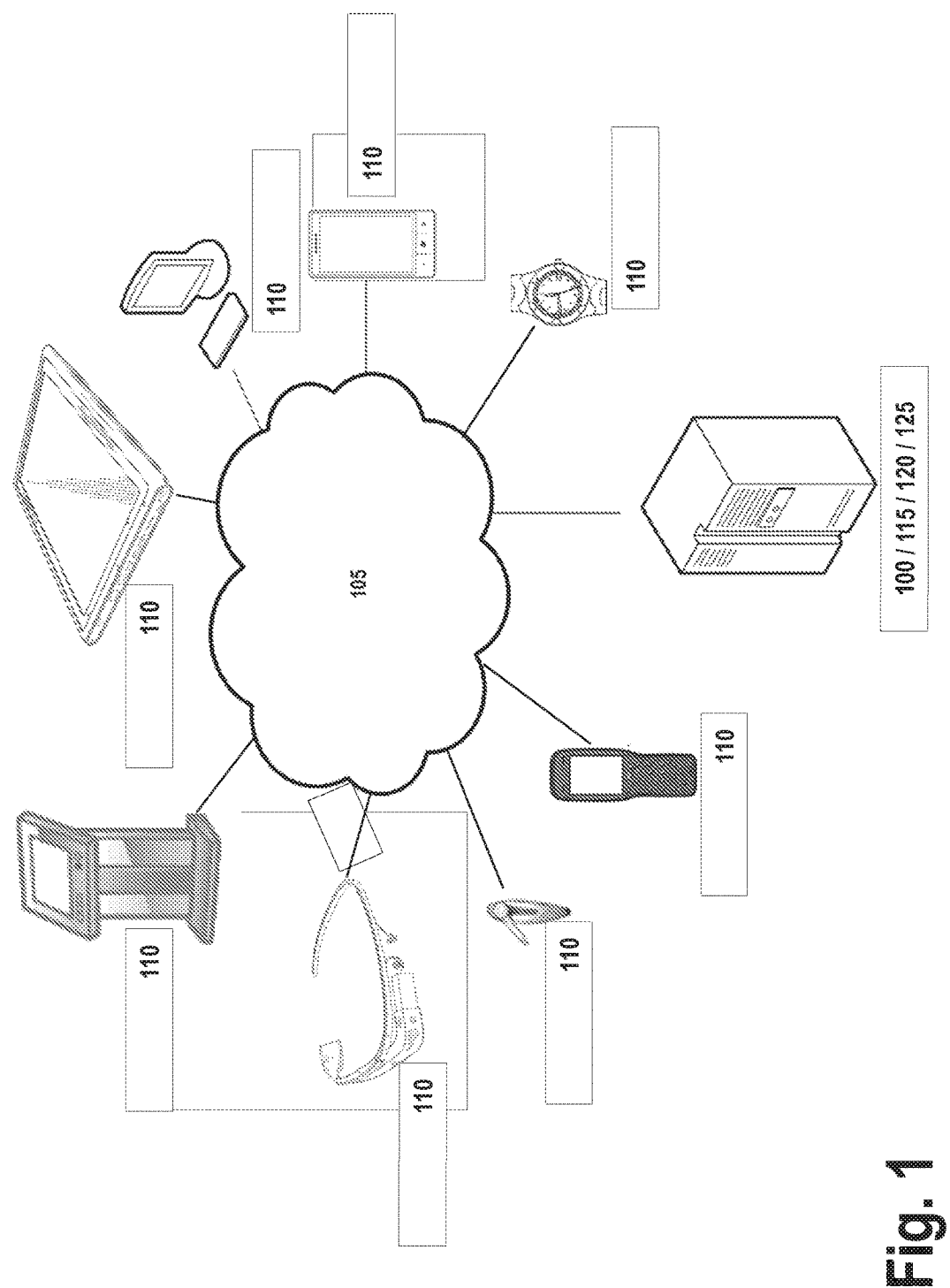
FIG. 1 is an overview of a system that can be used to practice embodiments of the present invention.

FIGS. 5-12, 13A, 13B, 14-15, and 17-31 are exemplary input and output that can be produced with various embodiments of the present invention.

FIGS. 16A, 16B, 16C, and 16D are exemplary packages with identifying information on the outside of the packages.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of an exemplary embodiment of the present invention. As shown in FIG. 1, this particular embodiment may include one or more carrier/transporter computing entities 100, one or more networks 105, one or more user computing entities 110, one or more payment computing entities 115, one or more retailer computing entities 120, one or more social media computing entities 125, and/or one or more mobile entity communications networks (comprising mobile switching centers (MSCs), service control points (SCPs), Home Location Registers (HLRs), Visitor Location Registers (VLRs), and/or the like). Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier/Transporter Computing Entity

Figure 2:
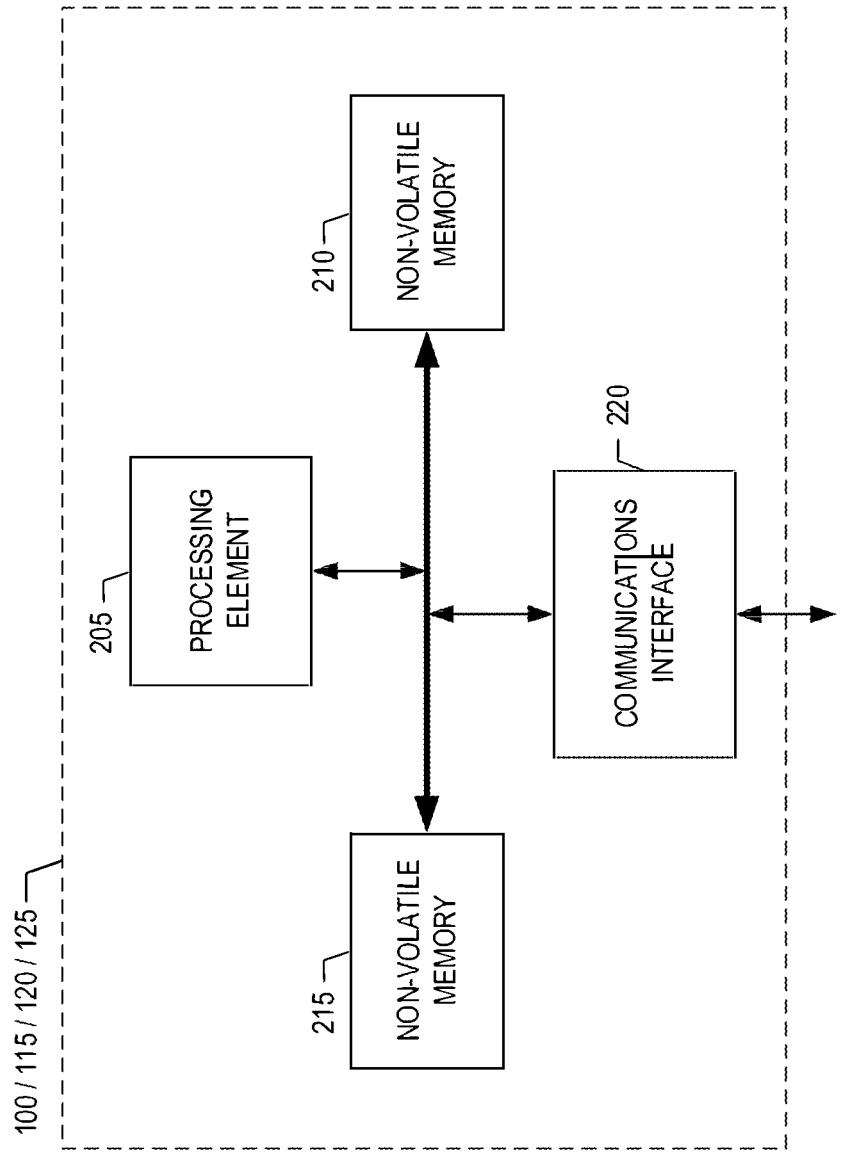
FIG. 2 is an exemplary schematic diagram of a carrier/transporter computing entity according to one embodiment of the present invention.

FIG. 2 provides a schematic of a carrier/transporter computing entity 100 according to one embodiment of the present invention. A carrier/transporter may be a traditional carrier/transporter, such as UPS, FedEx, DHL, courier services, the United States Postal Service (USPS), Canadian Post, and/or the like. However, a carrier/transporter may also be a nontraditional carrier/transporter, such as Amazon, Google, Uber, ride-sharing services, crowd-source couriers/services, Macy's, and/or the like. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, vehicles, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

The carrier/transporter computing entity 100 may also comprise, be in communication with, and/or be associated with various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components. The carrier/transporter computing entity 100 may comprise, be in communication with, and/or be associated with various payment networks/systems/entities for carrying out or facilitating the payment of fees. As will be recognized, the payment of such fees may be in a variety of forms, such as via debit cards, credit cards, direct credits, direct debits, cash, check, money order, Internet banking, e-commerce payment networks/systems/entities (e.g., PayPal, Google Wallet, Amazon Payments), virtual currencies (e.g., Bitcoins), award or reward points, and/or the like.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the carrier/transporter computing entity 100 may include or be in communication with one or more processing elements 205 (also referred to as processors, processing circuitry, and/or similar terms used herein interchangeably) that communicate with other elements within the carrier/transporter computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier/transporter computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the carrier/transporter computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier/transporter computing entity 100 with the assistance of the processing element 205 and operating system.

As indicated, in one embodiment, the carrier/transporter computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier/transporter computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the carrier/transporter computing entity 100 may include or be in communication with one or more input elements, such as a keyboard input, a mouse input, a touch screen/display input, motion input, movement input, audio input, pointing device input, joystick input, keypad input, and/or the like. The carrier/transporter computing entity 100 may also include or be in communication with one or more output elements (not shown), such as audio output, video output, screen/display output, motion output, movement output, and/or the like.

As will be appreciated, one or more of the carrier/transporter computing entity's 100 components may be located remotely from other carrier/transporter computing entity 100 components, such as in a distributed system. Furthermore, one or more of the components may be combined and additional components performing functions described herein may be included in the carrier/transporter computing entity 100. Thus, the carrier/transporter computing entity 100 can be adapted to accommodate a variety of needs and circumstances. As will be recognized, these architectures and descriptions are provided for exemplary purposes only and are not limiting to the various embodiments.

2. Exemplary User Computing Entity

Figure 3:
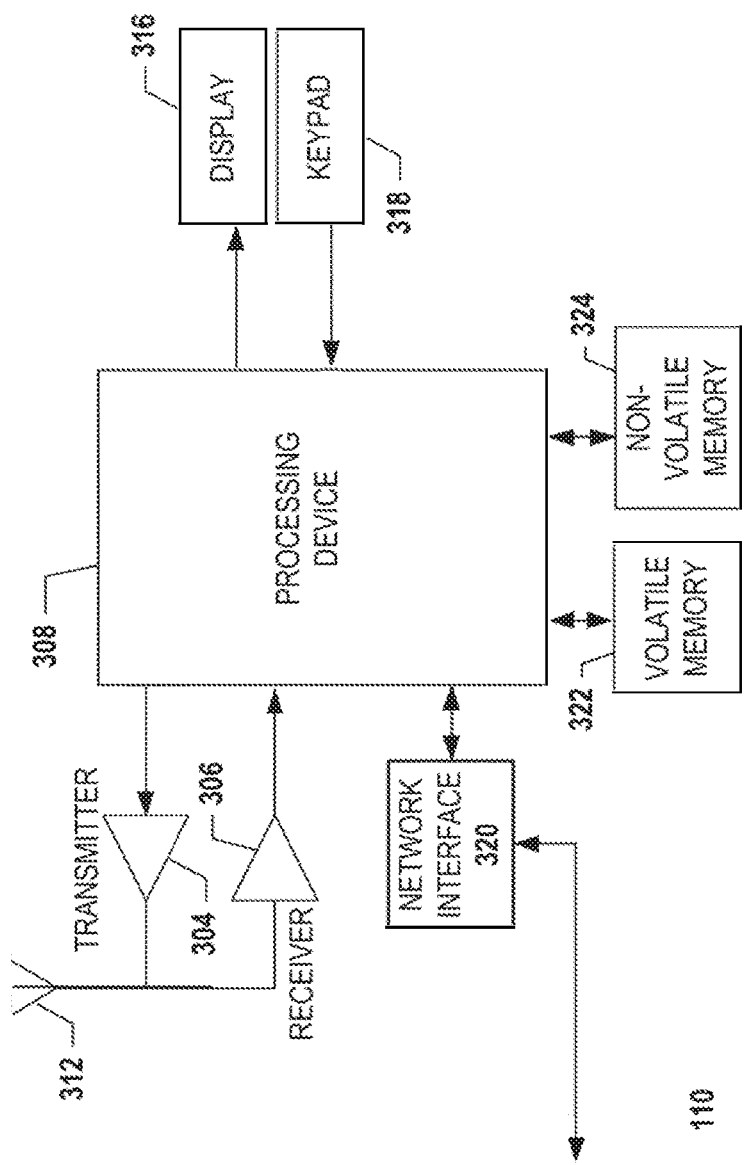
FIG. 3 is an exemplary schematic diagram of a user computing entity according to one embodiment of the present invention.

A user may be an individual, a family, a company, an organization, an entity, a department within an organization, a representative of an organization and/or person, and/or the like. To do so, a user may operate a user computing entity 110 that includes one or more components that are functionally similar to those of the carrier/transporter computing entity 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier/transporter computing entity 100. In a particular embodiment, the user computing entity 110 may operate in accordance with multiple wireless communication standards and protocols, such as UMTS, CDMA2000, 1×RTT, WCDMA, GSM<EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 110 may operate in accordance with multiple wired communication standards and protocols, such as those described above with regard to the carrier/transporter computing entity 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including wireless towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, wireless towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier/transporter computing entity 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier/transporter computing entity 100, payment computing entity 115, and/or various other computing entities.

In another embodiment, the user computing entity 110 may include one or more components or functionality that are the same or similar to those of the carrier/transporter computing entity 100, as described in greater detail above. As will be recognized, these architectures and descriptions are provided for exemplary purposes only and are not limiting to the various embodiments.

3. Exemplary Payment Computing Entity

In one embodiment, a payment computing entity 115 may include one or more components that are functionally similar to those of the carrier/transporter computing entity 100, the user computing entity 110, the retailer computing entity 120, social media computing entity 125, and/or the like. For example, in one embodiment, each payment computing entity 115 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the payment computing entity 115 to interact with and/or cause display of information from various other entities. As will be recognized, these architectures and descriptions are provided for exemplary purposes only and are not limiting to the various embodiments.

4. Exemplary Retailer Computing Entity

In one embodiment, a retailer computing entity 120 may include one or more components that are functionally similar to those of the carrier/transporter computing entity 100, the user computing entity 110, the payment computing entity 115, and/or the social media computing entity 125. A retailer may provide retail services, such as amazon.com, macys.com, dell.com, walmart.com, apple.com, staples.com, amazon.com, bestbuy.com, costco.com, alibaba.com, ebay.com, netflix.com, sears.com, AppleTV, Apple, Dish, Amazon Digital Services, AT&T U-verse, DIRECT TV, Google Play, QVC, Mojang, Blizzard, Capcom, Deepsilver, Zombie Studios, Epic Games, Valve, Carbon Games, Digital Extremes, Klei Entertainment, Riot Games, Frozenbyte, Nvidia Shield, Ouya, Xbox, Xbox 360, Xbox One, Wii, Wii U, PlayStation, PlayStation 2, PlayStation, PlayStation 3, PlayStation 4, 3DO, GameCube, Genesis, Intellivision, Nintendo 64, and/or the like. In one embodiment, each retailer computing entity 120 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the retailer computing entity 120 to interact with and/or cause display of information from various other entities. As will be recognized, these architectures and descriptions are provided for exemplary purposes only and are not limiting to the various embodiments.

5 Exemplary Mobile Entity Communications Networks

In one embodiment, the mobile entity communications networks for wireless services may include one or more MSCs, SCPs, VLRs, HLRs, call servers, and/or the like. The mobile entity communications networks may be owned and/or operated by entities, such as China Mobile, Vodafone, Telefónica, T-Mobile, Verizon, AT&T, Qtel, China Unicom, Airtel, Etisalat, and/or the like. The MSCs, SCPs, call servers, and/or the like may include one or more components that are functionally similar to those described above with respect to the carrier/transporter computing entity 100, the user computing entity 110, the payment computing entity 115, and/or the retailer computing entity 120. For example, in one embodiment, entities in the mobile entity communications networks may each include one or more (1) processing elements, (2) memory storage areas, (3) network interfaces, (4) antennae, (5) transceivers, (6) communication interfaces, and/or (7) other components. In one embodiment, although not shown, the MSC 110 may be connected to one or more radio access networks (RAN), including one or more one or more base station controllers (BSC) and one or more base transceiver stations (BTS). As will be recognized, the mobile entity communications networks may support a variety of network types (e.g., wired, wireless, and/or the like) and various communications standards and protocols (e.g., UMTS, CDMA2000, 1×RTT, WCDMA, TD-SCDMA, LTE, E-UTRAN, EVDO, HSPA, HSDPA, Wi-Fi, WiMAX, UWB, Customized Application of Mobile Enhanced Logic (CAMEL), Session Initiation Protocol (SIP), Wireless Intelligent Network (WIN), and/or the like).

6. Additional Social Media Computing Entities

In one embodiment, a social media computing entity 125 may include one or more components that are functionally similar to those of the carrier/transporter computing entity 100, the user computing entity 110, the payment computing entity 115, and/or the social media computing entity 125. Social media may include Facebook, LinkedIn, Google+, Pinterest, Microsoft Yammer, WMWare Socialcast, IBM Connections, SalesForce Chatter, Twitter, KaKao Talk, WhatsApp, WeChat, Yo, Etsy, Twitter, Instagram, Vine, Snapchat, YouTube, Qzone, Sina Weibo, Tumblr, LINE, WeChat, Ubisoft, and/or the like. In one embodiment, each social computing entity 125 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the social media computing entity 125 to interact with and/or cause display of information from various other entities. As will be recognized, these architectures and descriptions are provided for exemplary purposes only and are not limiting to the various embodiments.

III. EXEMPLARY SYSTEM OPERATION

Reference will now be made to FIGS. 4A, 4B, 5-12, 13A, 13B, 14-15, 16A, 16B, 16C, 16D, and 17-31. FIGS. 4A and 4B are flowcharts illustrating operations and processes. FIGS. 5-12, 13A, 13B, 14-15, and 17-31 are exemplary input and output. And FIGS. 16A, 16B, 16C, and 16D are exemplary packages.

1. Exemplary Registration/Enrollment

Figure 7:
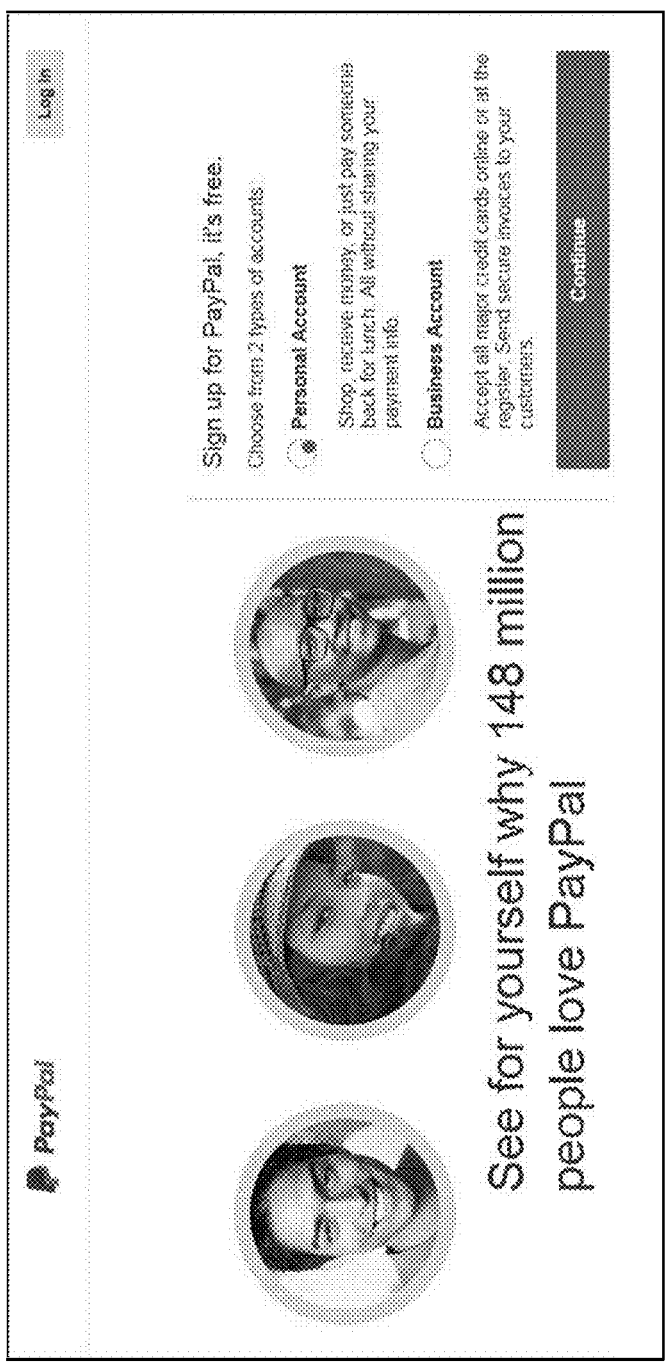

In one embodiment, as indicated in Block 400 of FIG. 4A, the process may begin with the enrollment/registration for one or more accounts, services, subscriptions, programs, and/or similar words used herein interchangeably (see FIGS. 5, 6, 7). In one embodiment, an account may be an account for wireless services with wireless service providers, such as an account with China Mobile, Vodafone, Telefónica, T-Mobile, Verizon, AT&T, Qtel, China Unicom, Airtel, Etisalat, and/or the like. An account may be a business or personal social media account, such as an account with Facebook, LinkedIn, Google+, Pinterest, Microsoft Yammer, WMWare Socialcast, IBM Connections, SalesForce Chatter, Twitter, KaKao Talk, WhatsApp, WeChat, Yo, Etsy, Twitter, Instagram, Vine, Snapchat, YouTube, Qzone, Sina Weibo, Tumblr, LINE, WeChat, and/or the like. An account may be a gaming account, such as an account with Ubisoft, Mojang, Blizzard, Capcom, Deepsilver, Zombie Studios, Epic Games, Valve, Carbon Games, Digital Extremes, Klei Entertainment, Riot Games, Frozenbyte, Nvidia Shield, Ouya, Xbox, Xbox 360, Xbox One, Wii, Wii U, PlayStation, PlayStation 2, PlayStation 3, PlayStation 4, 3DO, GameCube, Genesis, Intellivision, Nintendo 64, and/or the like. An account may be an entertainment account, such as an account with AppleTV, Apple, Dish, Amazon Digital Services, AT&T U-verse, DIRECT TV, Google Play, QVC, and/or the like. An account may be for retail services, such as an account with amazon.com, macys.com, dell.com, walmart.com, apple.com, staples.com, amazon.com, bestbuy.com, costco.com, alibaba.com, ebay.com, netflix.com, hulu.com, sears.com, and/or the like. An account may be for payment services, such as PayPal, Google Wallet, Amazon Payments, Booker, Erply, Leaf, Leapset, Micros, Revel, ShopKeep, TouchBistro, Vend, and/or the like. An account may be for pickup, delivery, and/or returns services with a carrier/transporter entity, such as an account with UPS for My Choice and/or the like. As will be recognized, a variety of different accounts can be used to adapt to various needs and circumstances.

In one embodiment, as part of the enrollment/registration process, a user (e.g., a user or user representative operating a user computing entity 110) may be requested to provide information/data (e.g., including user information/data, biographic information/data, geographic information/data, device or entity information/data, payment information/data, and/or the like). The information/data may be manually input by a user; may be automatically provided by allowing access to other accounts, such as Amazon.com, Facebook, Gmail, Twitter, PayPal, and/or the like; may be automatically collected by various computing entities (including automatic device identification); combinations thereof; and/or other techniques and approaches. For instance, the biographic information/data may include a user ID and/or the user's actual name, such as a first name, a last name, a company name, an entity name, an organization name, and/or the like. As indicated, a user may be an individual, a family, a company, an organization, an entity, a department within an organization, a representative of an organization and/or person, and/or the like. The geographic information/data may also include one or more addresses associated with the user (e.g., street address, city, state, postal code, and/or country). The addresses may be residential or commercial addresses, geocodes, latitude and longitude points, virtual addresses, and/or the like.

In one embodiment, the user information/data may include one or more communication preferences that identify communication formats for communicating with the user. The communication formats may include text messages (e.g., SMS, MMS), email messages, voice messages, video messages (e.g., YouTube, the Vine), picture messages (e.g., Instagram), social media messages (e.g., private social media created internally for entities, business social media (e.g., Yammer, SocialCast), and/or public social media (e.g., Facebook, Instagram, Twitter), emojis, and/or a variety of other messages in various communication formats. In addition to the one or more communication formats, the user (e.g., operating a user computing entity 110) can provide the corresponding electronic destination addresses or user IDs to be used in providing information/data associated with the notification/message services to the user (e.g., email addresses, online handles, phone numbers, usernames, user IDs, etc.). For instance, for text messages, the user may provide one or more wireless phone numbers. For email messages, the user may provide one or more email addresses. And for voice messages, the user may provide one or more wireless or landline phone numbers or other electronic destination addresses to which audio files can be delivered. Additionally, in one embodiment, validation operations can be performed with respect to each input electronic destination address—to ensure accuracy. As will be recognized, a variety of other types of electronic destination addresses can be used to adapt to various needs and circumstances.

In certain embodiments, the user (e.g., a user or user representative operating a user computing entity 110) may be requested to provide payment information/data. As indicated, payments (e.g., the payment information/data) may be in a variety of forms, such as via debit cards, credit cards, direct credits, direct debits, cash, check, money order, Internet banking, e-commerce payment networks/systems (e.g., PayPal, Google Wallet, Amazon Payments), virtual currencies (e.g., Bitcoins), award or reward points, and/or the like. Such payments may be made using a variety of techniques and approaches, including through NFC technologies such as PayPass, Android Beam, S Beam, BLE, and various other contactless payment systems. Further, such payment technologies may include PayPal Beacon, Booker, Erply, Leaf, Leapset, Micros, PayPal Here, Revel, ShopKeep, TouchBistro, Vend, and/or the like.

In one embodiment, device or entity information/data may also be received, provided, detected, assigned, collected, requested, and/or similar words used herein interchangeably as part of the registration/enrollment process. The device or entity information/data may include one or more entity or device identifiers-phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, Unique Device Identifiers (UDiDs), mobile identification numbers (MINs), IMSI_S (Short IMSIs), email addresses, usernames, user IDs, Globally Unique Identifiers (GUIDs), Integrated Circuit Card Identifiers (ICCIDs), electronic serial numbers (ESN), International Mobile Equipment Identities (IMEIs), Wi-Fi IDs, RFID tags, and/or the like. The device or entity information/data may include a device's vendor, model, specification authority, version, components, software specification and/or version, person associated with the device, and/or the like. The device or entity information/data may be used to communicate with and/or verify communications to and from the corresponding devices or entities.

In one embodiment, with the appropriate information/data, an appropriate computing entity (e.g., carrier/transporter computing entity 100, user computing entity 110, payment computing entity 115, retailer computing entity 120, social media computing entity 125, mobile entity communications network) may create or update an account with a user profile for the user via the enrollment/registration process. Accordingly, an appropriate computing entity (e.g., carrier/transporter computing entity 100, user computing entity 110, payment computing entity 115, retailer computing entity 120, social media computing entity 125, mobile entity communications network) may create, store, update, and/or have access to various accounts/user profiles and/or information/data associated with the accounts/user profiles. In addition to at least the information/data described above, each account/user profile may include one or more corresponding usernames, passwords, images, tokens, challenge phrases, reminders, and/or the like (referred to herein as credentials) for accessing accounts/user profiles, applications, services, entities, and/or the like.

As will be recognized, in one embodiment, the user (e.g., operating a user computing entity 110) may provide or allow access to the information/data for the user's contacts, connections, associations, friends, links, followers, and/or similar words used herein interchangeably. The information/data for the user's contacts may be stored by the user's computing entity 115 and/or by various other computing entities. In one embodiment, with access to the information/data for the user's contacts, an appropriate computing entity (e.g., carrier/transporter computing entity 100, user computing entity 110, payment computing entity 115, retailer computing entity 120, social media computing entity 125, mobile entity communications network) can carry out or facilitate carrying actions involving the same.

Figure 8:
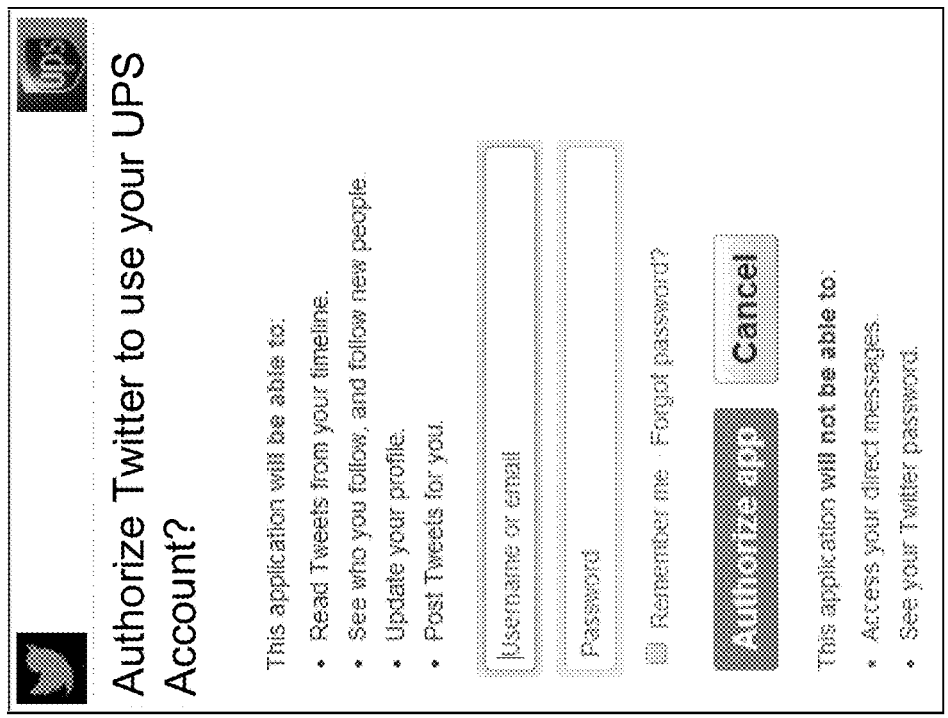
Figure 9:
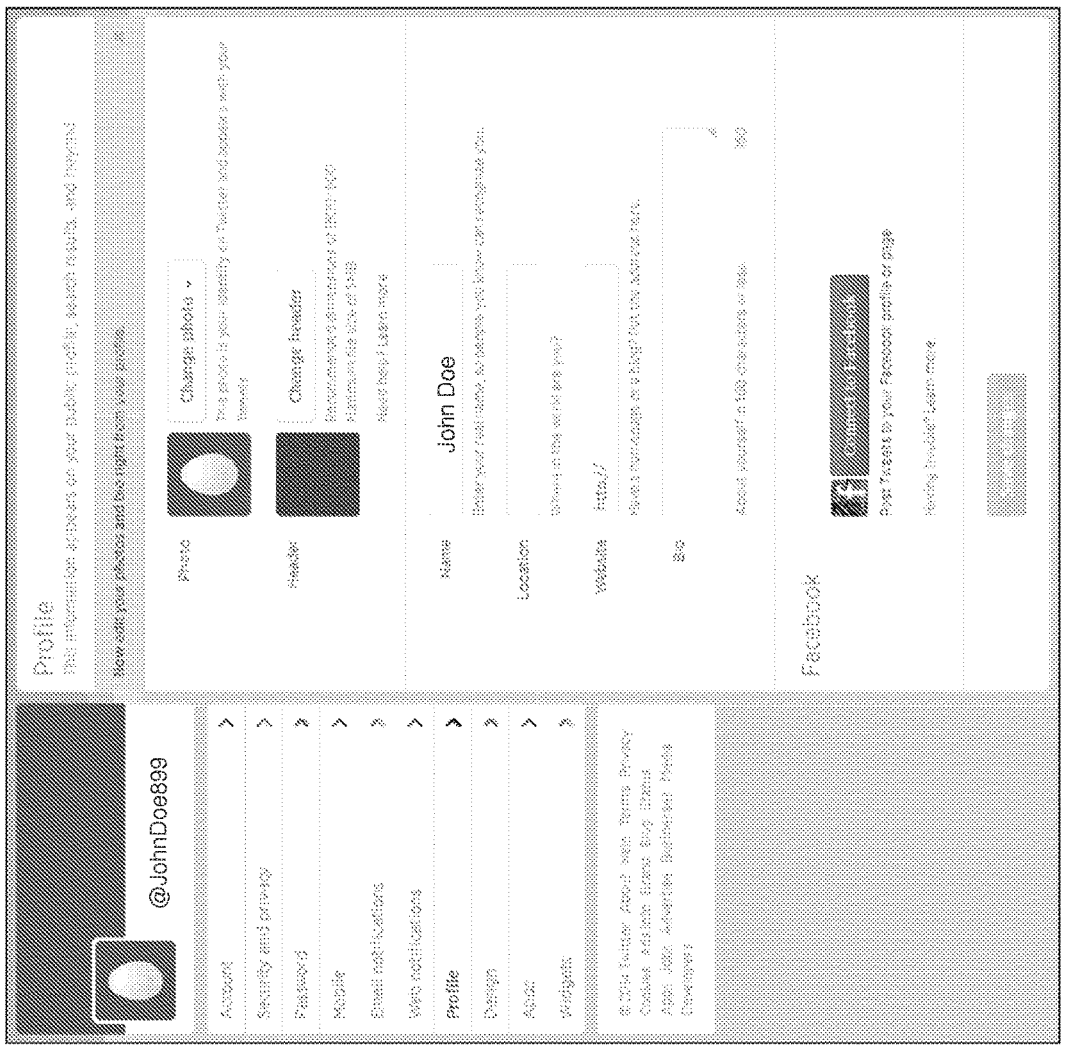

In one embodiment, once an account/user profile has been created, different accounts/user profiles may be associated with one another (Block 405 of FIG. 4A). For example, an account with a retailer (e.g., macys.com) may be associated with a social media account (e.g., Yo), an account with a carrier (e.g., UPS My Choice) may be associated with a social media account (e.g., Twitter) or a wireless service account (e.g., Verizon), and/or the like. To associate accounts/user profiles, a user (e.g., operating a user computing entity 110) may provide credentials or allow access to credentials to the appropriate computing entity (e.g., carrier/transporter computing entity 100, user computing entity 110, payment computing entity 115, retailer computing entity 120, social media computing entity 125, mobile entity communications network). For example, as shown in FIGS. 8-10, a user may connect a social media account (e.g., Twitter) with a carrier account (e.g., UPS' My Choice) by providing the corresponding credentials to the appropriate computing entity (e.g., carrier/transporter computing entity 100, user computing entity 110, payment computing entity 115, retailer computing entity 120, social media computing entity 125, mobile entity communications network). In this example, the user (e.g., operating a user computing entity 110) provides his carrier credentials to a social media account. As will be recognized (see FIG. 10), any number of credentials may be stored by various computing for access to and communication with the same. In connecting accounts, users may be required to agree to or accept the terms of services related to the accounts they are connecting-which may include agreeing to use location information/data from the user's computing entity 110 as described in U.S. application Ser. No. 13/839,398, which is hereby incorporated in its entirety by reference. Further, in other embodiments, an appropriate computing entity may be able to create a new account/user profile based on information/data for an existing account. For example, for a user with an account with the carrier/transporter entity, the carrier/transporter computing entity 100 can create a social media account for the corresponding user with the user's information/data. For instance, John Doe may have an account with UPS (username: JohnDoe899; password: *********). The carrier/transporter computing entity 100 (e.g., UPS) can automatically register John Doe for a social media account with the social media computing entity 125 (e.g., Twitter) and connect, link, and/or associate the accounts (See FIG. 10). By being connected, linked, and/or associated, information/data can be shared between the various entities to carry out various actions.

In one embodiment, by associating accounts with one another, a user may allow the appropriate computing entities (e.g., carrier/transporter computing entity 100, user computing entity 110, payment computing entity 115, retailer computing entity 120, social media computing entity 125, mobile entity communications network) to view messages sent or received by the user. For example, a carrier/transporter computing entity 100 may have access to a user's social media messages. A mobile entity communications network may have access to a user's carrier messages. A payment computing entity 115 may have access to a user's social media messages. An electronic message/notification may be an email message, a text-based message, an SMS message, an MMS message, a tweet, a retweet, a Yo, a notification, a status update, a post, a direct message, a picture, an image, a graphic, a video, a webpage, an icon-based message, a flash, a reply, a response, an update, a share, a vote, a blog, a reblog, a checkin, a tag, a presence, an event, a group message, a chat, a view, a read, and/or similar words used herein interchangeably depending on the platform/application being used. As will be recognized, a variety of other approaches and techniques can be used to adapt to various needs and circumstances.

2. Exemplary Carrier Server Entity Action Identifiers

In one embodiment, an electronic message/notification may include one or more action identifiers. An action identifier may be one or more alphanumeric characters, symbols, images, sounds, icons, smileys, ideograms, colors, graphics, strings, codes, barcodes, tags, Aztec Codes, Maxi-Codes, Data Matrices, Quick Response (QR) Codes, electronic representations, and/or the like. An action identifier may identify and/or trigger/initiate one or more actions that are to be carried out by an appropriate computing entity (e.g., carrier/transporter computing entity 100, user computing entity 110, payment computing entity 115, retailer computing entity 120, social media computing entity 125, mobile entity communications network). Exemplary action identifiers are shown in FIGS. 11, 12, 13A, and 13B.

In FIG. 11, #Track is an action identifier that is used to trigger/initiate tracking the item identified in or associated with the message. In FIG. 12, *Track is an action identifier that is used to trigger/initiate tracking the item identified in or associated with the message. In FIG. 13A, the symbol t is an action identifier that is used to trigger/initiate tracking the item identified in or associated with the message. In FIG. 13B, the graphic/icon  is an action identifier that is used to track the item identified in or associated with the message. Although not shown, other action identifiers may include advertising action identifiers (e.g., #Advertising) that trigger/initiate advertising to users/parties based on an item purchased or the shipping status of an item, for example. Other action identifiers may include location identifiers (e.g., #Geo) to determine/identify the location of users/parties, visibility identifiers to determine/identify the status of items or processes, and/or the like.

In FIG. 11, #Ship is an action identifier that is used to trigger/initiate shipment of an item. In FIG. 12, //Ship is an action identifier that is used to trigger/initiate shipment of an item. In FIG. 13A, the symbol n is an action identifier that is used to trigger/initiate shipment of an item. In FIG. 13B, the graphic/icon  is an action identifier that is used to trigger/initiate shipment of an item.

In FIG. 11, #PayShip is an action identifier that is used to trigger/initiate payment for and shipment of the item identified in or associated with the message. In FIG. 12, $$PayShip is an action identifier that is used to trigger/initiate payment for and shipment of the item identified in or associated with the message. In FIG. 13A, the symbol  is an action identifier that is used to trigger/initiate payment for and shipment of the item identified in or associated with the message. In FIG. 13B, the graphic/icon  is an action identifier that is used to trigger/initiate payment for and shipment of the item identified in or associated with the message. Further, #SocialBuy, * SocialBuy, #GroupBuy, *GroupBuy are action identifiers that are used to trigger/initiate the purchase of one or more items identified in or associated with the message in accordance with the corresponding group buying rules and/or social buying rules.

As shown in FIGS. 11 and 12, #TrackUPS and *TrackUPS are action identifiers that are used to trigger/initiate tracking of the item identified in or associated with the message using UPS. Similarly, #TrackCarrierName and *TrackCarrierName are action identifiers that are used to trigger/initiate tracking of the item identified in or associated with the message using the identified carrier/transporter entity.

In FIGS. 11 and 12, #ShipUPS and //ShipUPS are action identifiers that are used to trigger/initiate physical shipment of an item using UPS. Similarly, #ShipCarrierName and //ShipCarrierName are action identifiers that are used to trigger/initiate physical shipment of an item from point A to point B using the identified carrier/transporter entity.

In FIGS. 11 and 12, #PayShipUPS and $$PayShipUPS are action identifiers that are used to trigger/initiate payment for the item and shipment of the item identified in or associated with the message using UPS. These action identifiers can also trigger payment disbursement to the seller for the item. Further, #SocialBuyUPS, *SocialBuyUPS, #GroupBuyUPS, and * GroupBuyUPS are action identifiers that are used to trigger/initiate the purchase of one or more items identified in or associated with the message using UPS in accordance with the corresponding group buying rules and/or social buying rules. As also shown in FIGS. 11 and 12, #PayShipCarrierName and $$PayShipCarrierName are action identifiers that are used to trigger/initiate payment for and shipment of the item identified in or associated with the message using the identified carrier/transporter entity. And *GroupBuyRetailerName and * SocialBuyRetailerName are action identifiers that are used to trigger/initiate purchase of one or more items identified in or associated with the message using the identified retailer in accordance with the corresponding group buying rules and/or social buying rules.

As will be recognized, a variety of other approaches and techniques can be used to adapt to various needs and circumstances. For instance, as also shown in FIGS. 11 and 12, (1) #UPSPackage and *UPSPackage are action identifiers that are used to trigger/initiate determining/identifying and/or providing the status of an item using UPS, (2) #UPSDriver and *UPSDriver are action identifiers that are used to trigger/initiate determining/identifying and/or providing the status of the driver delivering an item using UPS, and (3) #UPSVehicle, *UPSVehicle, #UPSCar, and *UPSCar are action identifiers that are used to trigger/initiate determining/identifying and/or providing the location of the vehicle or car delivering an item using UPS. Further, (1) #UPSNDA and *UPSNDA are action identifiers that are used to trigger/initiate changing the delivery service level of an item to Next Day Air, (2) #UPS2DA and *UPS2DA are action identifiers that are used to trigger/initiate changing the delivery service level of an item to Second Day Air, and (3) #UPSGND and *UPSGND are action identifiers that are used to trigger/initiate changing the delivery service level of an item to Ground. Exemplary delivery service level may include Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. And (1) #UPSHold and *UPSHold are action identifiers that are used to trigger/initiate holding an item from delivery and (2) #UPSRedelivery and *UPSRedelivery are action identifiers that are used to trigger/initiate attempting redelivery of an item. As will be recognized, various other action identifiers can be used-including YES, NO, BUY, ORDER, PURCHASE, SELL, and/or the like. Such action identifiers can be used to trigger/initiate most any action by the appropriate computing entities (e.g., carrier/transporter computing entity 100, user computing entity 110, payment computing entity 115, retailer computing entity 120, social media computing entity 125, mobile entity communications network).

In one embodiment, a user's account can define default entities for carrying out various actions. For example, a user's account can be customized to define UPS as the default carrier to use for shipments shipped using #Ship action identifiers. The user's account can also define payment defaults or preferences, delivery defaults or preferences, packaging defaults or preferences, delivery service level defaults or preferences, and/or the like. Other customizations, defaults, and preferences can be used to adapt to various needs and circumstances.

3. Exemplary Use Cases

Select uses cases are provided below to assist in understanding embodiments of the present invention.

a. Exemplary Use Case 1: Physically Shipping an Item and Paying for Shipping

The following use case describes a user (e.g., operating a user computing entity 110) triggering/initiating the physical shipment of one or more items by providing an electronic message/notification with an appropriate action identifier as part of the electronic message/notification.

Figure 14:
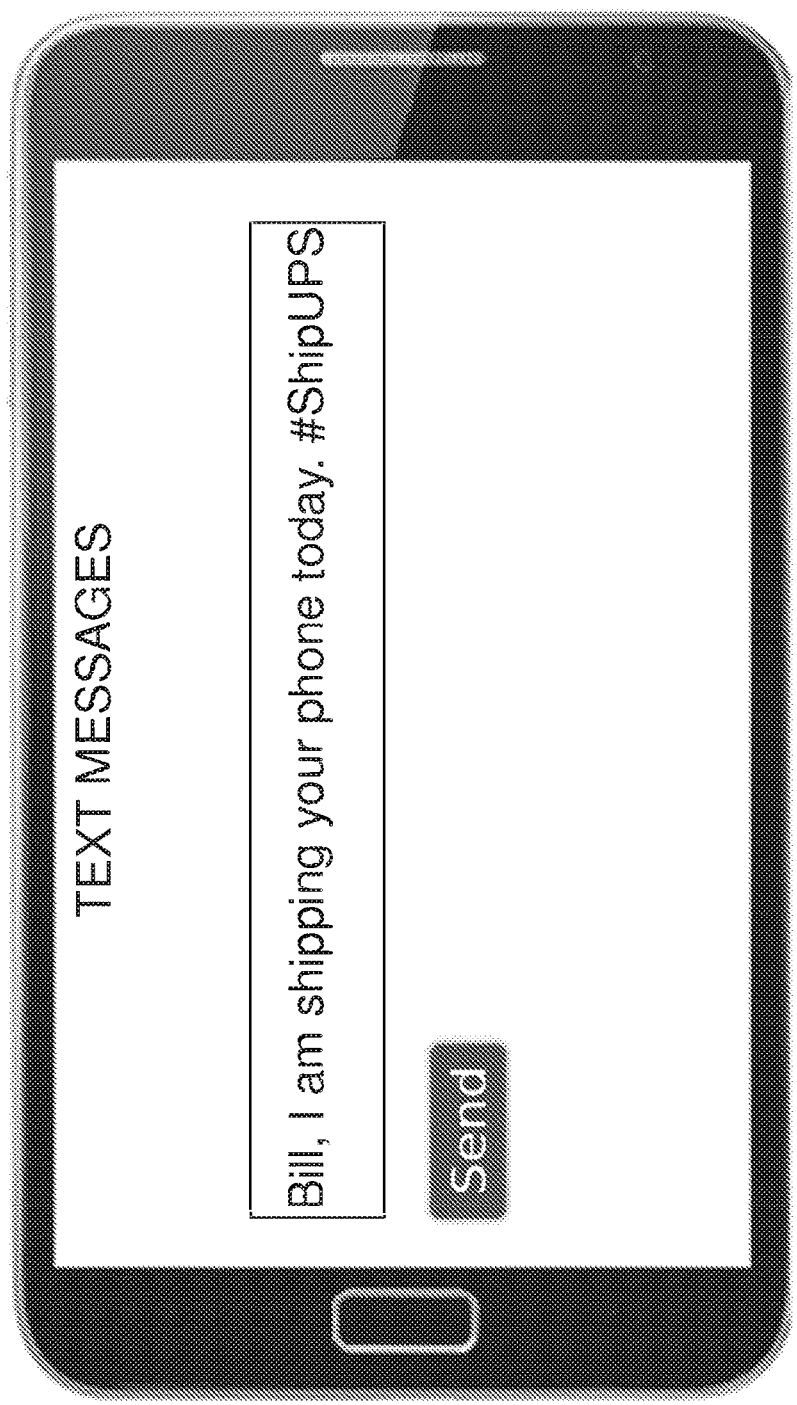

As indicated in Block 410 of FIG. 4A, a user (e.g., operating a user computing entity 110) can provide an electronic message/notification to any of a variety of users/parties and/or entities. As previously described, an electronic message/notification may be an email message, a text-based message, an SMS message, an MMS message, a tweet, a retweet, a Yo, a notification, a status update, a post, a direct message, a picture, an image, a graphic, a video, an icon-based message, a flash, a reply, a response, an update, a share, a vote, a blog, a reblog, a checkin, a tag, a presence, an event, a group message, a chat, a view, a read, and/or the like depending on the platform/application being used. In this example, as shown in FIG. 14, John (e.g., operating a user computing entity 115) sends an SMS text message to Bill (404.777.8989). The SMS text message identifies both John's phone number and Bill's phone (e.g., the electronic destination addresses for this communication). Further, in this example, the body of the SMS text message also includes the action identifier #ShipUPS. Although the following example is described in the context of an SMS text message, any other type of messaging platform/application can be used.

After John (e.g., operating a user computing entity 110) provides the message (e.g., sends, transmits, posts, initiates, and/or similar word used herein interchangeably), an appropriate computing entity can analyze the message (Block 415 of FIG. 4A). Analyzing the message may include determining/identifying the users/parties of the message (e.g., consignor/sender and consignee/intended recipient of the SMS text message) and determining/identifying whether any action identifiers are present in the message. That is, an appropriate computing entity can determine/identify whether any action identifiers in the form of alphanumeric characters, symbols, images, sounds, icons, smileys, ideograms, colors, graphics, strings, codes, barcodes, tags, Aztec Codes, MaxiCodes, Data Matrices, QR Codes, electronic representations, and/or the like are present in the message. Depending on the platform being used, a variety of computing entities can perform this function. For example, the user computing entity 110 (e.g., the sender's computing entity) can analyze the message before, after, or simultaneous to providing the message to, for example, a mobile entity communications network. In another example, a mobile entity communications network can analyze the message before, after, or simultaneous to providing the message to a computing entity of the intended recipient of the message. And in yet other examples, a carrier/transporter computing entity 100, a payment computing entity 115, a retailer computing entity 120, and/or a social media computing entity 125 can analyze the message.

In one embodiment, if an appropriate computing entity (e.g., carrier/transporter computing entity 100, user computing entity 110, payment computing entity 115, retailer computing entity 120, social media computing entity 125, mobile entity communications network) determines/identifies that no action identifiers are present in the message (Blocks 415 and 420 of FIG. 4B), the message can follow the normal message flow (Block 425 of FIG. 4B). In this particular example, the SMS text message will be provided by the mobile entity communications network to a computing entity of the intended recipient of the message as the normal message flow. However, if an appropriate computing entity (e.g., carrier/transporter computing entity 100, user computing entity 110, payment computing entity 115, retailer computing entity 120, social media computing entity 125, mobile entity communications network) determines/identifies that one or more action identifiers are present in the message (Blocks 415 and 420 of FIG. 4B), an appropriate computing entity can then determine/identify the users/parties of the message and determine/identify whether the users/parties of the message are properly registered/enrolled. To do so, the identity of each user/party needs to be determinable/identifiable from the message. In this case, the identities of the users/parties are determinable/identifiable based on the phone numbers in the message. That is, an appropriate computing entity can use the phone numbers in the message to identify the corresponding accounts/user profiles of the users/parties. In this case, an appropriate computing entity can use the phone numbers as lookups with the appropriate entity (e.g., using an API) to determine/identify the corresponding accounts/user profiles. That is, an appropriate computing entity can identify the accounts/user profiles that correspond to the sender of the message (e.g., consignor) and the intended recipient of the message (e.g., consignee). In other contexts, depending on the messaging platform/application, the identities of the users/parties can be determinable/identifiable from online handles, usernames, user IDs, screen names, and/or the like. For instance, in the Twitter context, John's identity can be determined/identified from his Twitter handle (@JohnDoe899), and Bill's identity can be similarly determined/identified. That is, their accounts/user profiles can be determined/identified from their Twitter handles.

By identifying the corresponding accounts/user profiles, additional information/data about the users/parties can be obtained, including their physical shipping addresses. That is, the phone numbers, online handles, usernames, user IDs, screen names, and/or the like can be used to resolve information/data about the users, including payment information/data, demographic information/data, and/or the like.

In one embodiment, with the identities of the users/parties determined/identified, an appropriate computing entity (e.g., carrier/transporter computing entity 100, user computing entity 110, payment computing entity 115, retailer computing entity 120, social media computing entity 125, mobile entity communications network) can determine/identify whether the users/parties are properly registered/enrolled (Block 435 of FIG. 4B). In this example, the users/parties need to be registered/enrolled for an account with the carrier/transporter for transportation and logistics services. For any users/parties not properly registered/enrolled with the carrier/transporter entity (or other entities in different contexts), an appropriate computing entity (e.g., carrier/transporter computing entity 100, user computing entity 110, payment computing entity 115, retailer computing entity 120, social media computing entity 125, mobile entity communications network) can require proper enrollment/registration to carry out the one or more actions corresponding to the one or more action identifiers (Block 430 of FIG. 4B). For example, an appropriate computing entity can provide a message or link or request information/data to assist in registering/enrolling any users. The registration/enrollment may be a "full" registration/enrollment (e.g., complete registration/enrollment) or a "lite" registration/enrollment (e.g., partial registration/enrollment) using information/data known about or collected/obtained from the users/parties.

In other embodiments, users/parties do not necessarily need to be registered/enrolled with any particular entity. In one example in the shipping context, if one or both users/parties are not registered/enrolled with the carrier/transporter, the carrier/transporter computing entity 100 can obtain/request information/data about the users/parties from an appropriate computing entity. For instance, the carrier/transporter computing entity 100 can send a request to the mobile entity communications network (e.g., Mobile, Vodafone, Telefónica, T-Mobile, Verizon, AT&T, Qtel, China Unicom, Airtel, and/or the like) of the users/parties in this case for their information/data using their phone numbers as the lookup or key. The request may be a request for the physical addresses of the users/parties (e.g., resolve the phone numbers to physical addresses), for payment information/data for paying for shipping (e.g., resolve the phone numbers to payment information/data), and/or the like. The mobile entity communications networks can determine/identify the requested information/data and respond with the same. In another example in the shipping context, the carrier/transporter computing entity 100 determine/identify the physical addresses from previous pickups or deliveries from the users/parties, previous histories and/or interactions with the users/parties, and/or the like. As will be recognized, a variety of other approaches and techniques can be used to adapt to various needs and circumstances.

Figure 15:
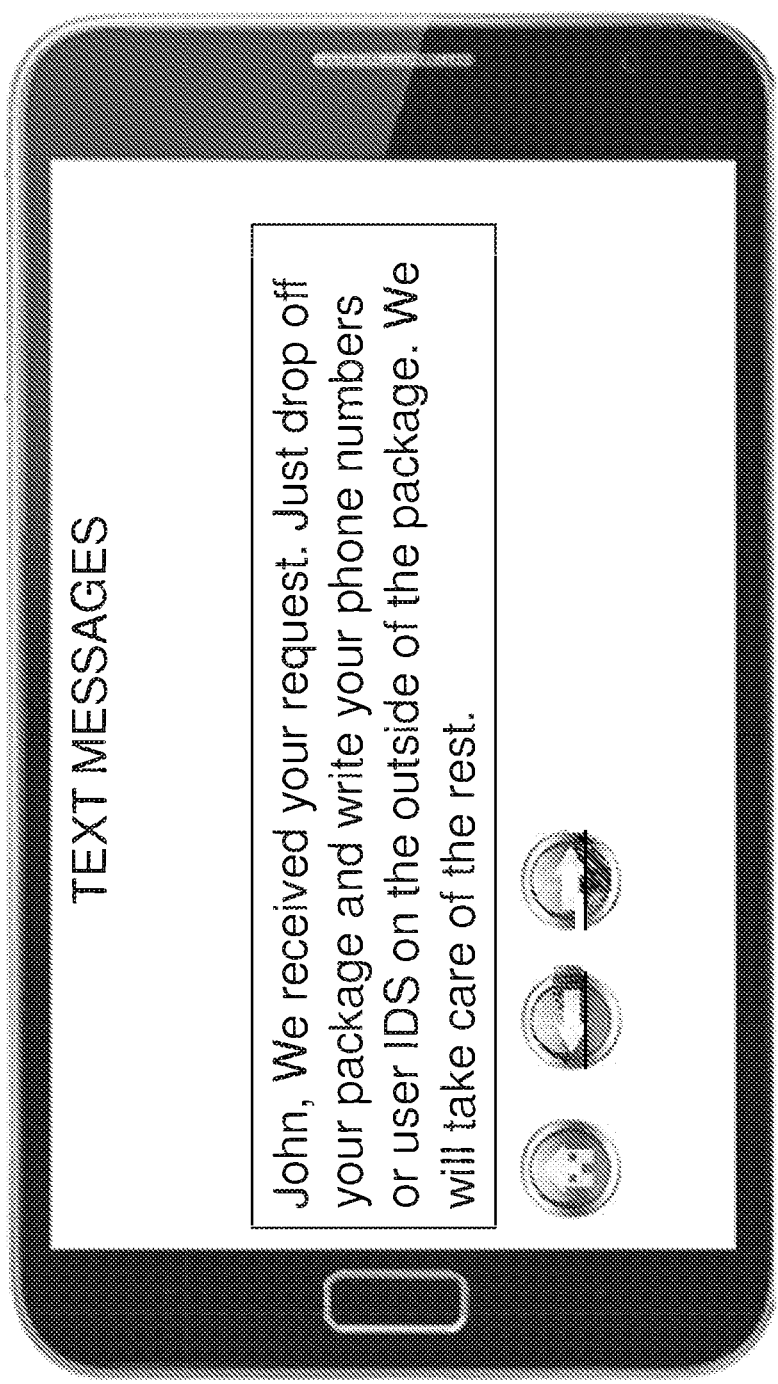
Figure 16B:
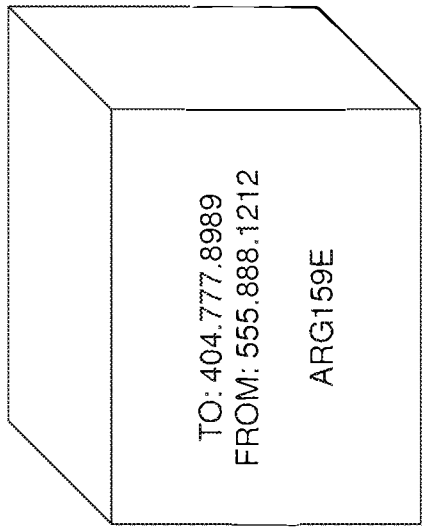
Figure 16D:
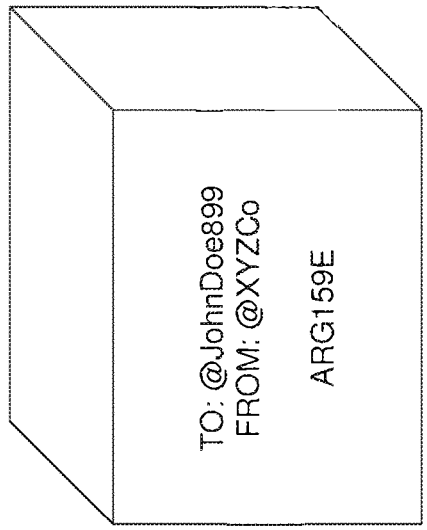
Figure 16A:
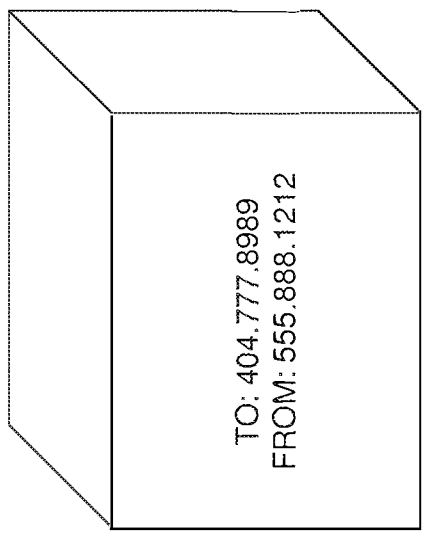
Figure 16C:
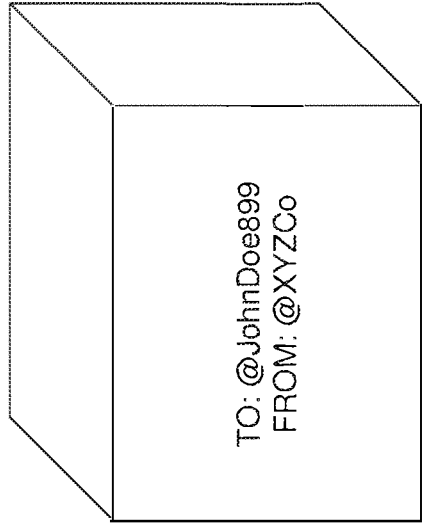

In one embodiment, with the identities of the users/parties determined/identified and the users/parties properly registered/enrolled (if necessary), an appropriate computing entity (e.g., carrier/transporter computing entity 100, user computing entity 110, payment computing entity 115, retailer computing entity 120, social media computing entity 125, mobile entity communications network) can determine/identify whether any action requirements (if applicable) are satisfied or met (Block 440 of FIG. 4B). In this example, the action requirements may require the payment information/data to be determinable/identifiable, the payment information/data to be confirmed if multiple payment options are available (if there isn't a default option, for instance), the delivery service level to be provided, and/or to have the physical addresses confirmed if multiple address are associated with the profiles (if there isn't a default option, for instance) or if a different delivery location is desired. If any applicable action requirements are not satisfied or met, an appropriate computing entity can provide a notification/message to the users/parties (e.g., consignors/senders and consignees/intended recipients) regarding the same (Block 445 of FIG. 4B). For example, this may include the carrier/transporter computing entity 100 providing a notification/message to the sender/consignor requesting details of the weight, size, and delivery service level of the item or confirming which a plurality of address or payment options to use. If any applicable action requirements are satisfied or met, an appropriate computing entity (e.g., carrier/transporter computing entity 100, user computing entity 110, payment computing entity 115, retailer computing entity 120, social media computing entity 125, mobile entity communications network) can initiate/trigger the action and provide notifications/messages to the users/parties regarding the same (Blocks 450 and 455 of FIG. 4B). The messages/notifications may be provided as a reply to the sender's message, for instance, and/or in compliance with any communication preferences. For example, FIG. 15 is a confirmation message provided to the user (e.g., sender) that the request to ship an item has been received. The message may also provide further instructions to the user.

As will be recognized, an item may be any tangible, physical, or electronic object data structure, application, and/or the like. Such items may comprise the ability to communicate with other items for a variety of purposes. Thus, as used herein, the term item should be construed in a broad sense.

As also indicated, an appropriate computing entity (e.g., carrier/transporter computing entity 100, user computing entity 110, payment computing entity 115, retailer computing entity 120, social media computing entity 125, mobile entity communications network) can trigger/initiate the one or more actions corresponding to the action identifiers. In this example, the mobile entity communications network analyzes the message and triggers/initiates the shipping action. To do so, the mobile entity communications network can provide a message to the carrier/transporter computing entity 100 indicating that John (555.888.1212) plans to ship an item to Bill (404.777.8989). Based on the message provided by the mobile entity communications network, the carrier/transporter computing entity 100 can identify the accounts/profiles for John and Bill using their phone numbers as lookups or keys (or other information/data) and automatically generate/create an item/shipment record for the same. In other examples, the accounts/profiles can be determined/identified from online handles, usernames, user IDs, screen names, emojis, characters, images, icons, text, colors, and/or the like. The shipping record may include information/data about the sender/consignor, the consignee/intended recipient of the item, the item, the delivery service level for the item, payment information/data, and/or the like.

In one embodiment, in addition to generating/creating a shipping record, the carrier/transporter computing entity 100 can automatically provide an item/shipment label (corresponding to the item/shipment record) to be printed and affixed to the item/shipment. The item/shipment label can be affixed by the sender/consignor and/or the carrier/transporter. In another embodiment, John can tender the item/shipment to the carrier/transporter with only the phone numbers of Bill and John on the exterior of the packaging of the item/shipment (see FIG. 16A)—or online handles, usernames, user IDs, screen names, and/or the like in other contexts. In the label less example, the carrier/transporter computing entity 100 can identify the corresponding item/shipment record based on the phone numbers for Bill and John once the item/shipment is received by the carrier/transporter. The carrier/transporter computing entity 100 can then verify the item/shipment by determining/identifying the corresponding shipping record, generate/create a label to be applied to the exterior of the item/shipment if not already affixed, update the corresponding item/shipment record to indicate the relevant activity, determine/identify the weight and size of the item/shipment (e.g., including determining/identifying the dim weight of the item/shipment), determine/identify the transportations costs to be charged for transporting the item/shipment, charge the transportation costs for transporting the item/shipment, and allow the item/shipment to be transported through the carrier's transportation and logistics network. This may involve one or more carriers/transporters as described U.S. Pat. Nos. 8,712,923 and 8,712,922, which are hereby incorporated in their entireties by reference.

In one embodiment, instead of or in addition to the phone numbers being on the outside of the package for the item/shipment, the carrier/transporter computing entity 100 can provide a unique identifier (e.g., ARG159E shown in FIG. 16B) to the sender to be applied to the exterior of the package to identify individual items/shipments (e.g., if John sends multiple shipments to Bill) and/or as a further control measure. In one embodiment, such unique identifiers may be represented as text, barcodes, tags, character strings, Aztec Codes, MaxiCodes, Data Matrices, QR Codes, electronic representations, and/or the like. Such concepts are described in U.S. Pat. No. 8,010,463, which his hereby incorporated in its entirety by reference.

b. Exemplary Use Case 2: Purchasing and Paying for an Item and Paying for Physical Shipment of the Item The following use case describes a user (e.g., operating a user computing entity 110) purchasing one or more items by providing a message/notification with an appropriate action identifier as part of the electronic message/notification.

Figure 17:
Figure 20:
Figure 23:
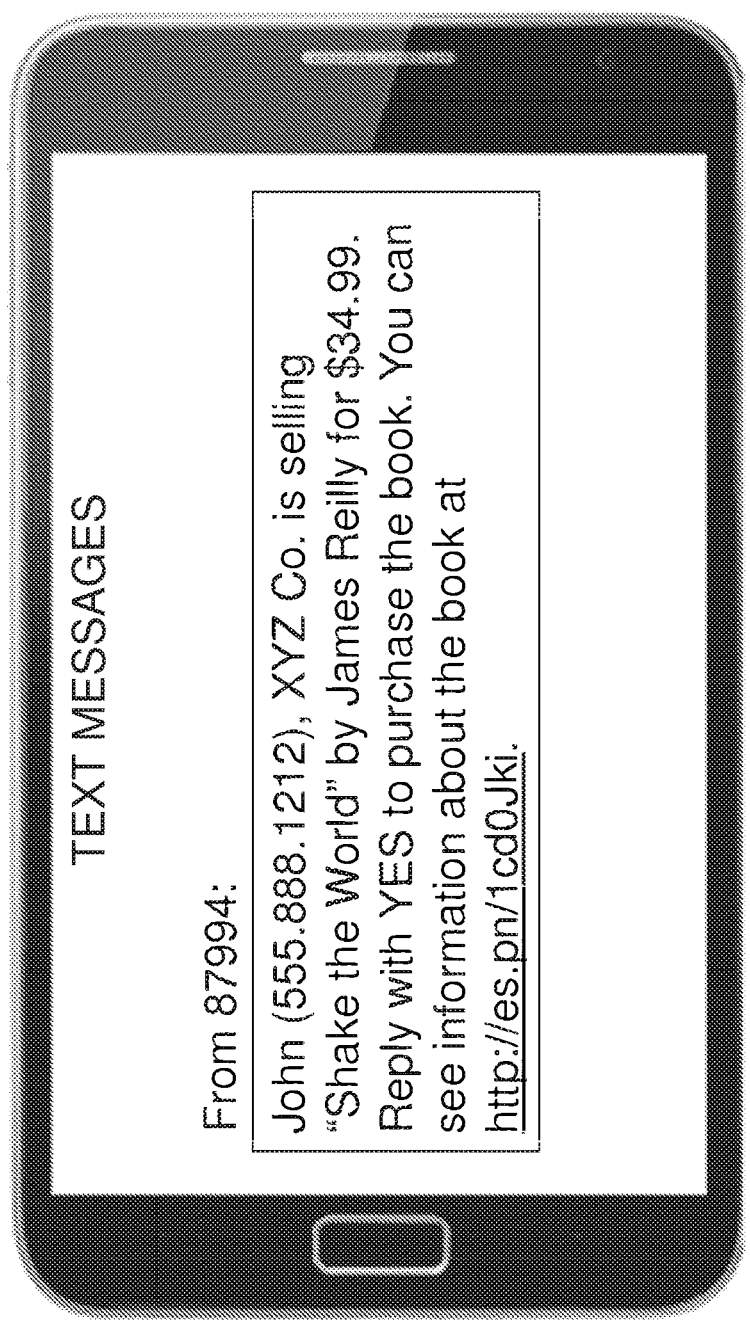
Figure 24:
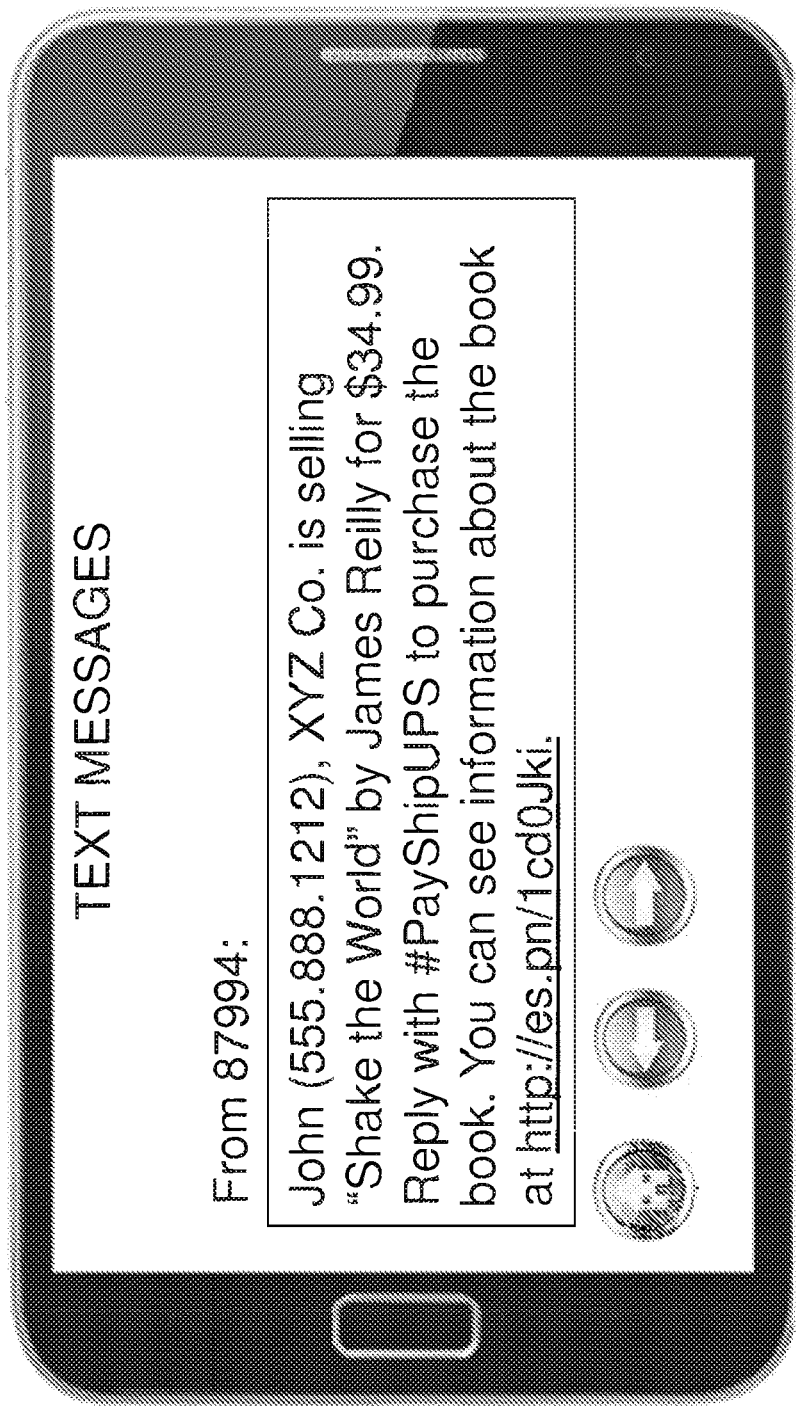

A user (e.g., operating a user computing entity 110) can be provided with and view advertisements in a variety of user-friendly ways. For example, as shown in FIG. 17, a user (e.g., operating a user computing entity 110) can be provided with and view an electronic advertisement for a book as a tweet or advertisement/message in a Twitter timeline. As shown in FIG. 20, a user (e.g., operating a user computing entity 110) can be provided with and view an electronic advertisement for a book as part of her news feed. And as shown in FIGS. 23 and 24, a user (e.g., operating a user computing entity 110) can be provided with and view an electronic advertisement for a book from a text message that includes a URL to an address with additional details about the book. In the following example, the book is being sold by a retailer, which can be any entity large or small. As will be recognized, a variety of other approaches and techniques can be used to adapt to various needs and circumstances.

Figure 18:
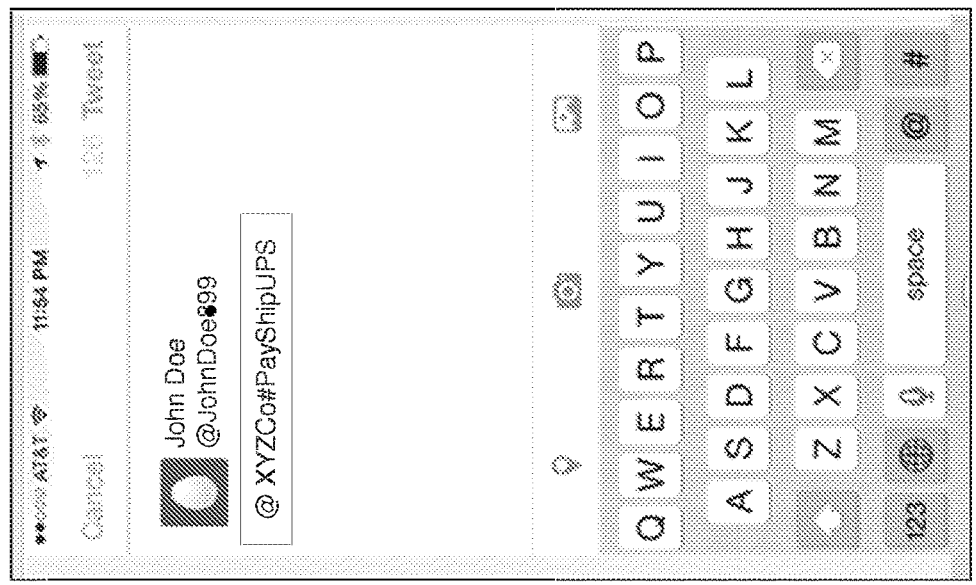
Figure 19:
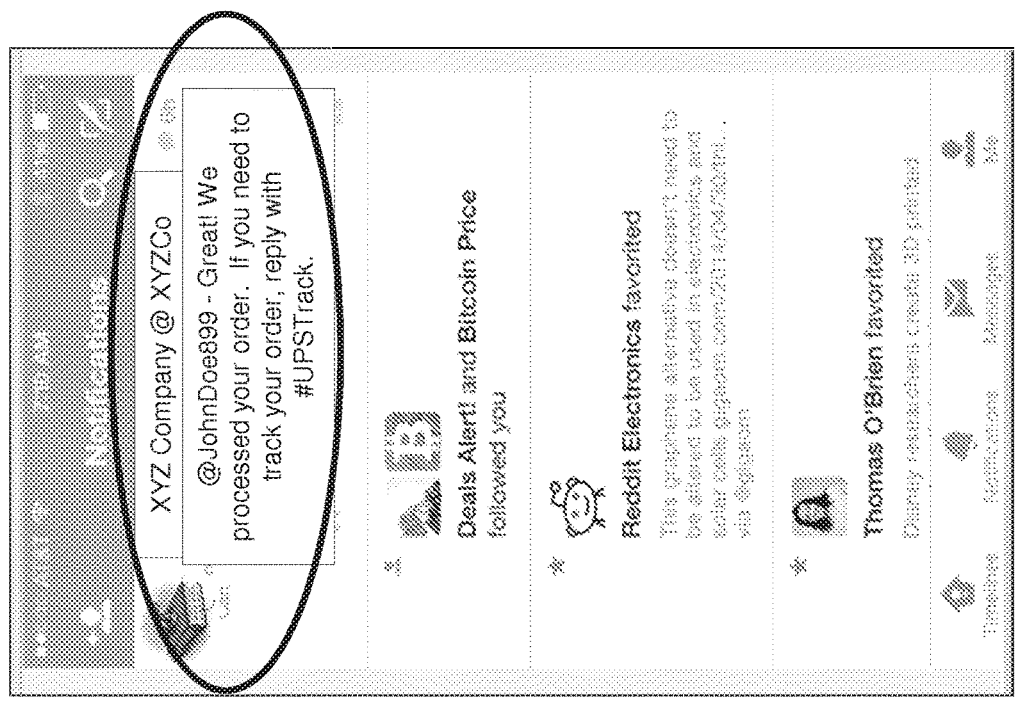
Figure 21:
Figure 25:
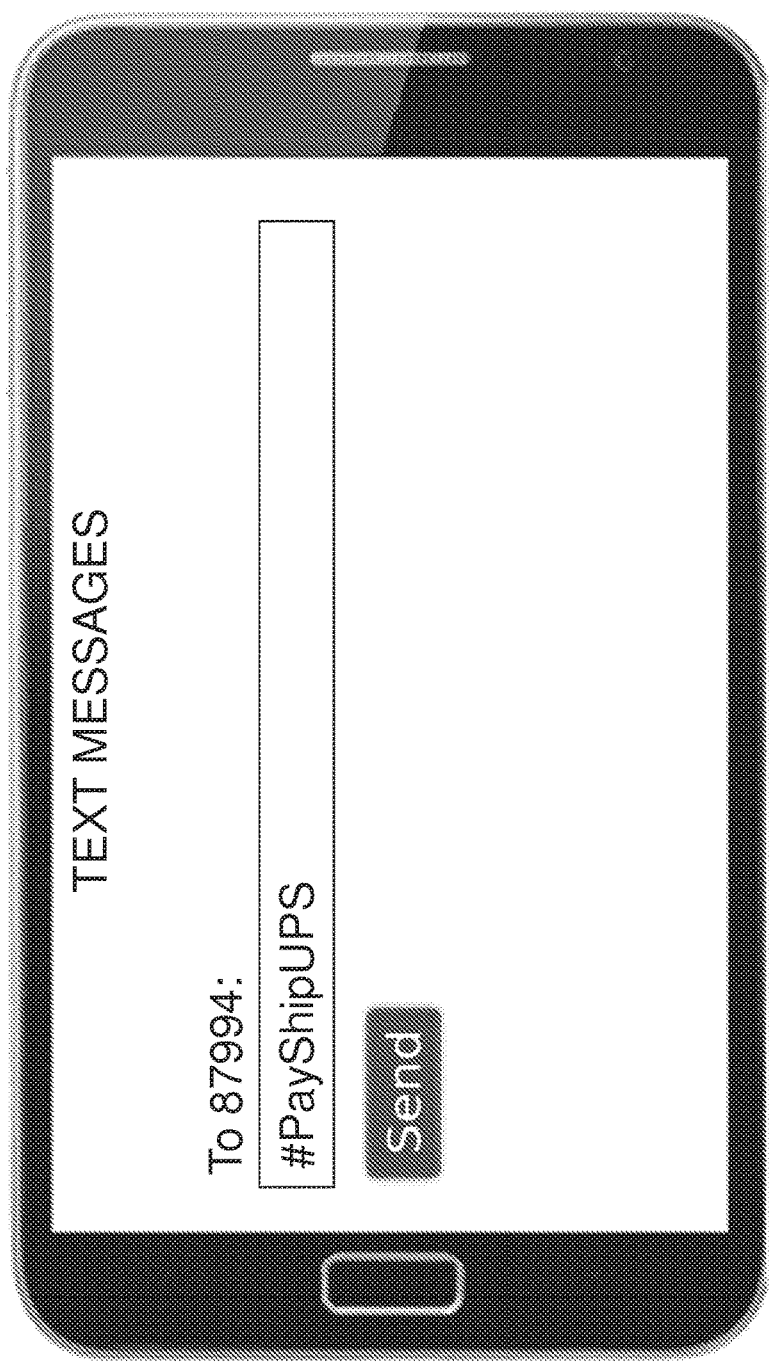
Figure 26:
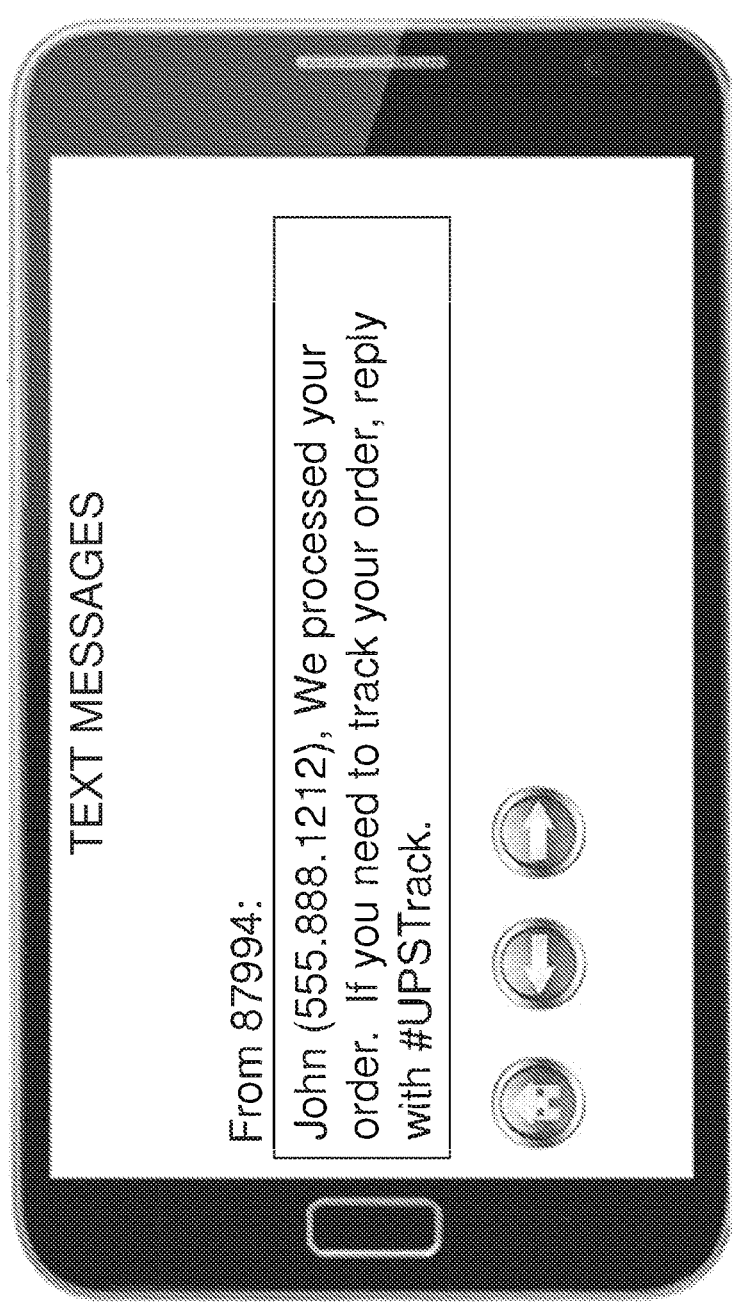

After viewing the electronic advertisement, the user may decide that she wants to purchase the book. To purchase the book, the user may simply follow the instructions in the electronic advertisement. In FIG. 17, the instructions indicate that the user (e.g., operating a user computing entity 110) should simply reply to the tweet or advertisement/message and include #PayShipUPS in the reply. In FIG. 20, the instructions indicate that the user (e.g., operating a user computing entity 110) should share or comment on the electronic advertisement and include #PayShipUPS as part of the share or comment. And in FIGS. 23 and 24, the instructions indicate that the user (e.g., operating a user computing entity 110) should reply to the text message with YES or #PayShipUPS. In each of these examples, the reply, share, comment, and text message are all considered messages/notifications. As previously noted, electronic messages/notifications may be any form of electronic communication including email messages, text-based messages, SMS messages, MMS messages, tweets, retweets, Yos, notifications, status updates, posts, direct messages, pictures, videos, icon-based messages, flashes, replies, responses, updates, shares, votes, blogs, reblogs, checkins, tags, presences, events, group messages, chats, views, reads, and/or the like depending on the platform/application being used. In these examples, the user provides a message by replying to the tweet or advertisement/message, commenting on or sharing the electronic advertisement, and/or responding to the text message. Each of these is shown in FIGS. 18, 21, and 25. In FIG. 18, the user (e.g., operating a user computing entity 110) provides a message by replying to the tweet or advertisement/message (from @JohnDoe899 to @XYZCo with the action identifier of #PayShipUPS). In FIG. 19, the user (e.g., operating a user computing entity 110) provides a message by commenting on or sharing the item in the news feed with #PayShipUPS. And in FIG. 25, the user (e.g., operating a user computing entity 110) provides a message by replying to the text message with the electronic advertisement with the text #PayShipUPS (or YES in the other example).

In each of the above examples, the parties to the sales/purchase transaction are either included as part of the message and/or are determinable/identifiable from information/data in the message. For example, in FIG. 19, the parties are determinable/identifiable by their Twitter IDs in the message. The buyer is @JohnDoes899, and the retailer is @XYZCo. In FIG. 21, the parties are similarly determinable/identifiable: the buyer is John Doe (johndoe7), and the retailer is XYZ Co. In FIG. 25, the parties are determinable/identifiable from the phone numbers used to send and receive the text messages: the buyer is 555.888.1212, and the retailer is 87994. Further, in each message, an action identifier is included. In these particular examples, the action identifiers are #ShipUPS and YES.

In one embodiment, the item and quantity being purchased can be identifiable/determinable in a variety of ways. For example, the item can be identified/determined as a response to an electronic advertisement. That is, the response can be linked to or associated with the electronic advertisement to determine/identify the item being purchased. Responses to the advertisement then can be used to automatically identify the item. In other examples, the message with the action identifier can include a URL to the item, the name of the item, the color of the item, the size of the item, the style of the item, the quantity of the item, the stock keeping unit (SKU) number of the item, and/or the like. Using this information or data, an appropriate computing entity can identify the item from the message, for example, using the URL, name, or SKU. As will be recognized, a variety of other approaches and techniques can be used to adapt to various needs and circumstances to identify the appropriate items for purchase.

After John (e.g., operating a user computing entity 110) provides the message (e.g., sends, transmits, posts, initiates, and/or similar word used herein interchangeably), an appropriate computing entity can analyze the message (Block 415 of FIG. 4A). Analyzing the message may include determining/identifying the parties of the message (as noted above) and determining/identifying whether any action identifiers are present in the message. That is, an appropriate computing entity can determine/identify whether any action identifiers in the form of alphanumeric characters, symbols, images, sounds, icons, smileys, ideograms, colors, graphics, strings, codes, barcodes, tags, Aztec Codes, MaxiCodes, Data Matrices, QR Codes, electronic representations, and/or the like are present in the message. Depending on the platform being used, a variety of computing entities can perform this function. For example, in FIGS. 17-19, the user computing entity 110 (e.g., the sender's computing entity) can analyze the message before, after, or simultaneous to providing the message to, for example, a mobile entity communications network. Or, a mobile entity communications network can analyze the message before, after, or simultaneous to providing the message to a computing entity of the intended recipient of the message. In FIGS. 17-19 and 23-26, the user computing entity 110 (e.g., the sender's computing entity) can analyze the message before, after, or simultaneous to providing the message to, for example, a mobile entity communications network. Or, a social media computing entity 125 or a mobile entity communications network can analyze the message. As will be recognized, a carrier/transporter computing entity 100, a payment computing entity 115, or a retailer computing entity 120 can also analyze the message depending on the platform and configuration.

In one embodiment, if an appropriate computing entity (e.g., carrier/transporter computing entity 100, user computing entity 110, payment computing entity 115, retailer computing entity 120, social media computing entity 125, mobile entity communications network) determines/identifies that no action identifiers are present in the message (Block 420 of FIG. 4B), the message can follow the normal message flow (Block 425 of FIG. 4B). However, if an appropriate computing entity (e.g., carrier/transporter computing entity 100, user computing entity 110, payment computing entity 115, retailer computing entity 120, social media computing entity 125, mobile entity communications network) determines/identifies that one or more action identifiers are present in the message (Blocks 415 and 420 of FIG. 4B), an appropriate computing entity can then determine/identify the users/parties of the message and determine/identify whether the users/parties of the message are properly registered/enrolled. To do so, the identity of each user needs to be determinable/identifiable from the message. In the described examples, the identities of the users/parties are determinable/identifiable based on their phone numbers, Twitter IDs, and/or user IDs. That is, an appropriate computing entity can use the phone numbers, Twitter IDs, and/or user IDs as lookups with the appropriate entity (e.g., using APIs) to determine/identify the corresponding accounts/user profiles. In other contexts, depending on the messaging platform/application, the identities of the users/parties can be determinable/identifiable from online handles, usernames, screen names, device IDs, and/or the like.

By identifying the corresponding accounts/user profiles, additional information/data about the users/parties can be obtained, including the purchasing party's physical shipping address and payment information/data. That is, the phone numbers, online handles, usernames, user IDs, screen names, and/or the like can be used to resolve information/data about the users, including payment information/data, physical address information/data, and/or the like.

In one embodiment, with the identities of the users/parties determined/identified from the message, an appropriate computing entity (e.g., carrier/transporter computing entity 100, user computing entity 110, payment computing entity 115, retailer computing entity 120, social media computing entity 125, mobile entity communications network) can determine/identify whether the users/parties are properly registered/enrolled (Block 435 of FIG. 4B). In this example, the users/parties need to be registered/enrolled for an account with the carrier/transporter for transportation and logistics services. In other examples, registration with other entities may be required. For any users/parties not properly registered/enrolled, an appropriate computing entity (e.g., carrier/transporter computing entity 100, user computing entity 110, payment computing entity 115, retailer computing entity 120, social media computing entity 125, mobile entity communications network) can require proper enrollment/registration to carry out the one or more actions corresponding to the one or more action identifiers (Block 430 of FIG. 4B). For example, an appropriate computing entity can provide a message or link or request information/data to assist in registering/enrolling each user if necessary. The registration/enrollment may be a full registration/enrollment (e.g., complete registration/enrollment) or a lite registration/enrollment (e.g., partial registration/enrollment) using information/data known about or collected/obtained from the users/parties.

In other embodiments, users/parties do not necessarily need to be registered/enrolled with any particular entity. If the users/parties are not registered/enrolled with the carrier/transporter, the carrier/transporter computing entity 100 can obtain/request information/data about the users/parties from an appropriate computing entity. For instance, the carrier/transporter computing entity 100 can send requests to user computing entities 110, payment computing entities 115, retailer computing entities 120, social media computing entities 125, mobile entity communications entities, and/or the like of the users/parties in these examples for various information/data. The request may be for their physical addresses, payment information/data, and/or the like. In other examples, information/data from previous pickups or deliveries from the users/parties, previous histories and/or interactions with the users, previous histories and/or purchase transactions with the users, and/or the like. As will be recognized, a variety of other approaches and techniques can be used to adapt to various needs and circumstances.

In one embodiment, with the identities of the users/parties determined/identified and the users/parties properly registered/enrolled (if necessary), an appropriate computing entity (e.g., carrier/transporter computing entity 100, user computing entity 110, payment computing entity 115, retailer computing entity 120, social media computing entity 125, mobile entity communications network) can determine whether any action requirements (if applicable) are satisfied or met (Block 440 of FIG. 4B). In this example, the action requirements may require the payment information/data to be determinable/identifiable, the payment information/data to be confirmed if multiple payment options are available (if there isn't a default option, for instance), the delivery service level to be provided, and/or to have the physical addresses confirmed if multiple address are associated with the profiles (if there isn't a default option, for instance) or if a different delivery location is desired. If any applicable action requirements are not satisfied or met, an appropriate computing entity can provide a notification/message to the users/parties (e.g., senders and/or intended recipients) of the same (Block 445 of FIG. 4B). If any applicable action requirements are not satisfied or met, an appropriate computing entity can provide a notification/message to the users/parties (e.g., consignors/senders and consignees/intended recipients) regarding the same (Block 445 of FIG. 4B). For example, this may include the carrier/transporter computing entity 100 providing a notification/message to the sender/consignor requesting details confirming which a plurality of address or payment options to use.

If any applicable action requirements are satisfied or met, an appropriate computing entity (e.g., carrier/transporter computing entity 100, user computing entity 110, payment computing entity 115, retailer computing entity 120, social media computing entity 125, mobile entity communications network) can initiate/trigger the action and provide notifications/messages to the users/parties regarding the same (Blocks 450 and 455 of FIG. 4B). In this example, an appropriate computing entity triggers/initiates the purchase of the book (for the specified quantity) from the retailer and the shipping the book using UPS.

To initiate/trigger purchase of the book, an appropriate computing entity can provide a message/notification to the retailer computing entity 120 with details regarding the sales/purchase transaction. In one embodiment, the details of the sales/purchase transactions can be provided periodically, regularly, or in response to certain triggers using a flat file, for example. In another embodiment, the details can be provided to the retailer computing 120 via real-time messages. FIG. 27 shows a real-time message from an appropriate computing entity to a retailer computing entity 120 with the details of a sales/purchase transaction. The message can identify the purchasing party based on the user's/party's Twitter ID, phone number, or user ID. Based on the message provided, an appropriate computing entity can determine/identify (e.g., resolve) the accounts/profiles for any parties using the Twitter IDs, phone numbers, or user ID. As part of initiating/triggering the purchase of the book, an appropriate computing entity can initiate/trigger payment for the book and the transfer of the requisite funds to any appropriate entities/parties (e.g., retailers, carriers/transporters, shippers). For example, an appropriate computing entity may charge a user's/party's credit card or account and/or transfer the funds to the retailer's account (with or without a service fee). As will be recognized, this may also include the carrier/transporter warehousing goods for retailers and packaging, shipping, and transporting the goods. In such a case, the carrier/transporter can perform many or all of the actions of a retailer. Further, this may include carriers/transporters being retailers in e-commerce.

An appropriate computing entity can also provide a message to the carrier/transporter computing entity 100 of the sales/purchase transaction. The carrier/transporter computing entity 100 can identify the accounts/profiles for users/parties of the sales/purchase transaction and generate/create an item/shipment record for the same using the Twitter IDs, phone numbers, user IDs, and/or the like. The carrier/transporter computing entity 100 can then automatically generate/create a label to be applied to the exterior of the item/shipment. However, as previously described, the item/shipment can be tendered to the carrier/transporter with or without a label. If tendered without a label (and with or without a unique identifier), the exterior of the package should include the appropriate users, parties, online handles, usernames, user IDs, screen names, phone numbers, device IDs, and/or the like (see FIGS. 16A, 16B, 16C, and 16D). This will allow the carrier/transporter computing entity 100 to verify the item/shipment by determining/identifying the corresponding shipping record, generate/create a label to be applied to the exterior of the item/shipment if not already affixed, update the corresponding item/shipment record to indicate the relevant activity, determine/identify the weight and size of the item/shipment (e.g., including determining/identifying the dim weight of the item/shipment), determine/identify the transportations costs to be charged for transporting the item/shipment, charge the transportation costs for transporting the item/shipment, and allow the item/shipment to be transported through the carrier's transportation and logistics network.

Figure 22:
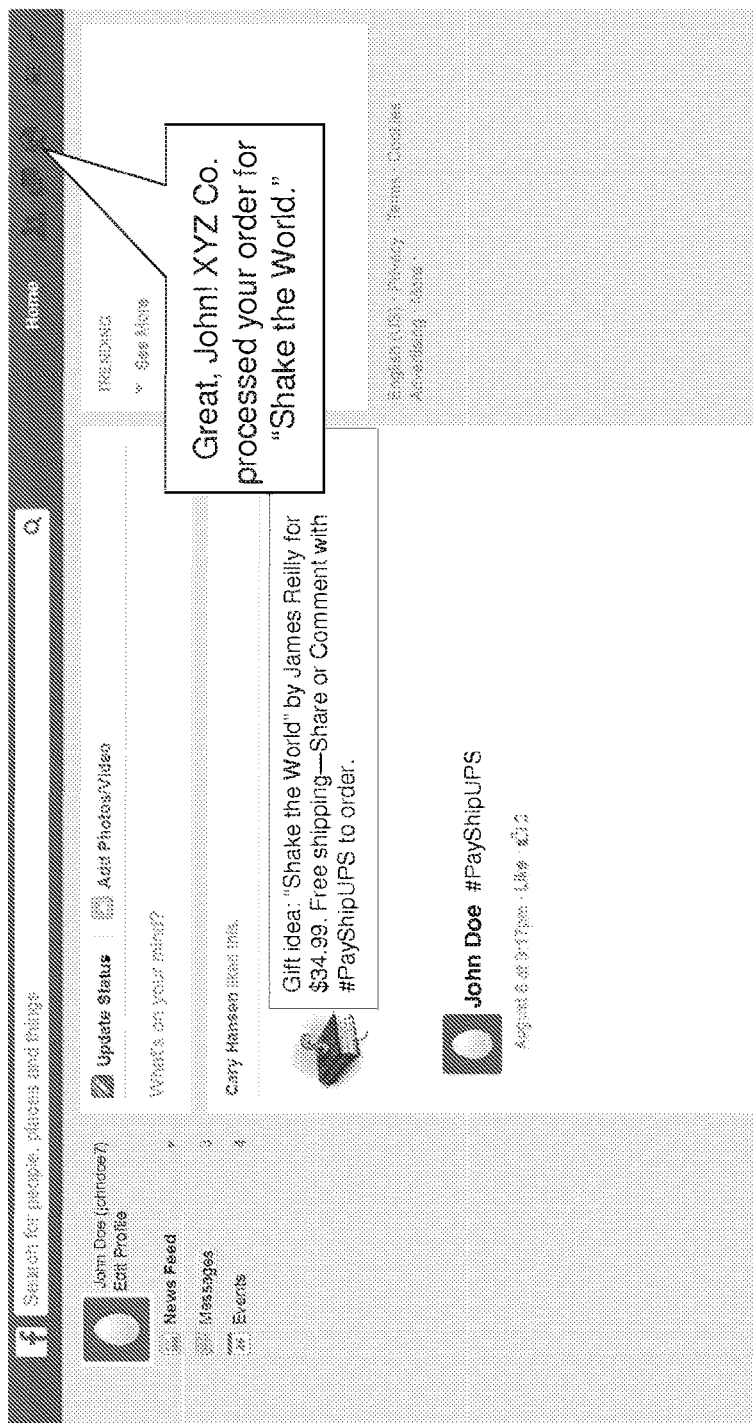

In one embodiment, an appropriate computing entity (e.g., carrier/transporter computing entity 100, user computing entity 110, payment computing entity 115, retailer computing entity 120, social media computing entity 125, mobile device communications networks) can provide a confirmation message/notification for the sales/purchase transaction to various the various users/parties (Block 455 of FIG. 4B). As will be recognized, such confirmation messages/notifications can provided in a variety of ways. For example, as shown in FIG. 19, an appropriate computing entity can provide an electronic message/notification in the user's Twitter timeline that the sales/purchase transaction was completed for her. In FIG. 22, the electronic message/notification is provided in the Facebook notifications section with a callout. And in FIG. 26, the electronic message/notification is a text message to the user confirming the sales/purchase transaction. As will be recognized, the messages/notifications can include various advertisements as described in U.S. application Ser. Nos. 14/472,922 and 14/472,895, which are hereby incorporated in their entireties by reference. As will be recognized, a variety of other approaches and techniques can be used to adapt to various needs and circumstances.

c. Exemplary Use Case 3: Purchasing and Paying for an Item in a Social or Group Context and Paying for Physical Shipment of the Item The following use case describes a user (e.g., operating a user computing entity 110) purchasing one or more items by providing messages with appropriate action identifiers as part of the messages/notifications.

Figure 28:
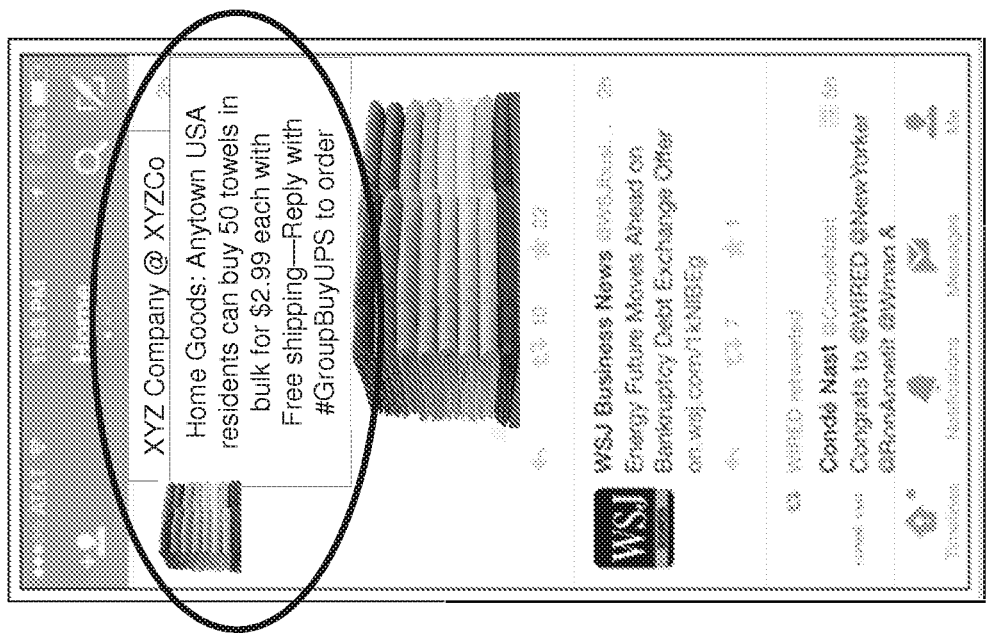
Figure 29:
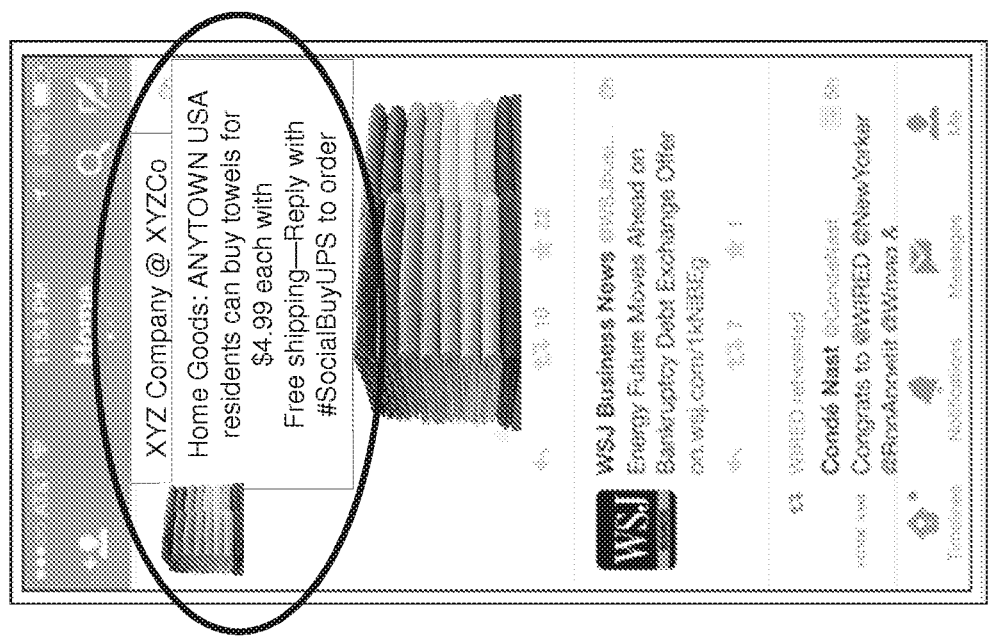
Figure 30:
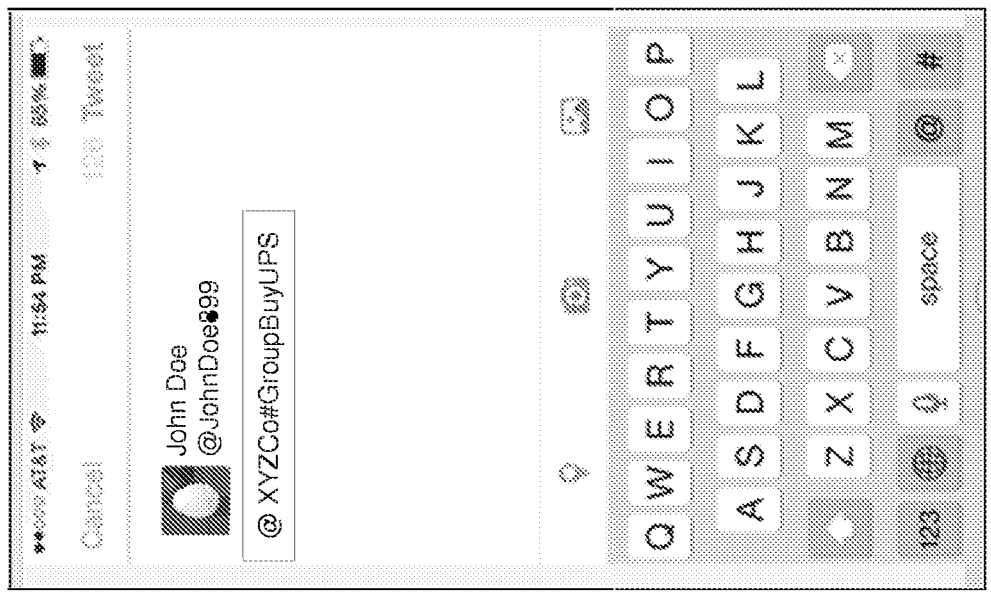
Figure 31:
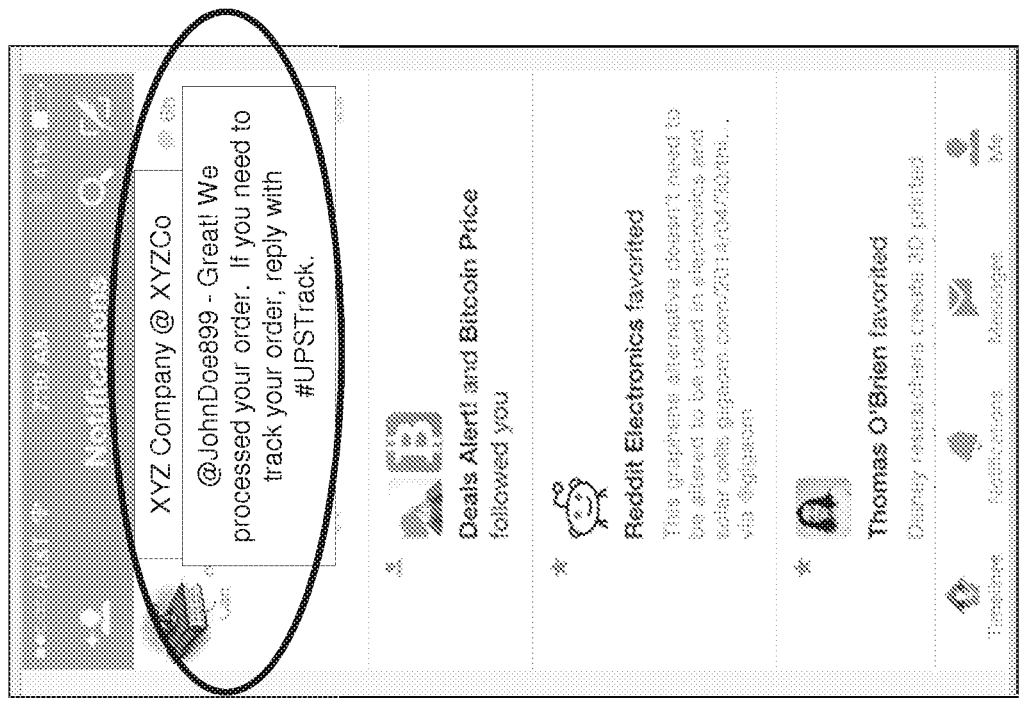

A user (e.g., operating a user computing entity 110) can be provided with and view advertisements in a variety of user-friendly ways. For example, as shown in FIGS. 28 and 29, a user (e.g., operating a user computing entity 110) can be provided with and view an electronic advertisement for towels as a tweet or advertisement/message in a Twitter timeline. After viewing the electronic advertisement, the user may decide that she wants to purchase the towels. To purchase the towels, the user may simply follow the instructions in the electronic advertisement. In FIG. 28, the instructions indicate that the user (e.g., operating a user computing entity 110) should simply reply to the tweet or advertisement/message and include #GroupBuyUPS in the reply. In FIG. 29, the instructions indicate that the user (e.g., operating a user computing entity 110) should simply reply to the tweet or advertisement/message and include #SocialBuyUPS in the reply. In these examples, the user provides a message by replying to the tweet or advertisement/message. In FIG. 30, the user (e.g., operating a user computing entity 110) provides a message by replying to the tweet or electronic advertisement/message (from @JohnDoe899 to @XYZCo with the action identifier of #GroupBuyUPS).

In the above example, the parties to the sales/purchase transaction are either included as part of the message and/or are determinable/identifiable from information/data in the message. For example, in FIG. 30, the parties are determinable/identifiable by their Twitter IDs in the message. The buyer is @JohnDoes899, and the retailer is @XYZCo. In this example, the action identifier is #GroupBuyUPS. In one embodiment, the item and quantity being purchased can be identifiable/determinable in a variety of ways. For example, the item can be identified/determined as a response to an electronic advertisement. That is, the response can be linked to or associated with the electronic advertisement to determine/identify the item being purchased. Responses to the advertisement then can be used to automatically identify the item. In other examples, the message with the action identifier can include a URL to the item, the name of the item, the color of the item, the size of the item, the style of the item, the quantity of the item, the SKU number of the item, and/or the like. Using this information or data, an appropriate computing entity can identify the item from the message, for example, using the URL, name, or SKU. As will be recognized, a variety of other approaches and techniques can be used to adapt to various needs and circumstances to identify the appropriate items for purchase.

After John (e.g., operating a user computing entity 110) provides the message (e.g., sends, transmits, posts, initiates, and/or similar word used herein interchangeably), an appropriate computing entity can analyze the message (Block 415 of FIG. 4A). Analyzing the message may include determining/identifying the parties of the message (as noted above) and determining/identifying whether any action identifiers are present in the message. Depending on the platform being used, a variety of computing entities can analyze the message. In this example, the user computing entity 110 (e.g., the sender's computing entity) can analyze the message before, after, or simultaneous to providing the message to, for example, a mobile entity communications network. Or, a social media computing entity 125 or a mobile entity communications network can analyze the message.

In one embodiment, if an appropriate computing entity (e.g., carrier/transporter computing entity 100, user computing entity 110, payment computing entity 115, retailer computing entity 120, social media computing entity 125, mobile entity communications network) determines/identifies that no action identifiers are present in the message (Block 420 of FIG. 4B), the message can follow the normal message flow (Block 425 of FIG. 4B). However, if an appropriate computing entity determines/identifies that one or more action identifiers are present in the message (Block 420 of FIG. 4B), an appropriate computing entity can then determine/identify the users/parties of the message and whether the users/parties of the message are properly registered/enrolled. To do so, the identity of each user needs to be determinable/identifiable from the message. In this example, the identities of the users/parties are determinable/identifiable based on their Twitter IDs. That is, an appropriate computing entity can use the Twitter IDs as lookups with the appropriate entity (e.g., using APIs) to determine/identify the corresponding accounts/user profiles. In other contexts, depending on the messaging platform/application, the identities of the users/parties can be determinable/identifiable from online handles, usernames, screen names, device IDs, and/or the like. Thus, the Twitter IDs, phone numbers, online handles, usernames, user IDs, screen names, and/or the like can be used to resolve information/data about the users, including payment information/data, physical address information/data, and/or the like.

In one embodiment, with the identities of the users/parties determined/identified from the message, an appropriate computing entity (e.g., carrier/transporter computing entity 100, user computing entity 110, payment computing entity 115, retailer computing entity 120, social media computing entity 125, mobile entity communications network) can determine/identify whether the users/parties are properly registered/enrolled (Block 435 of FIG. 4B). In this example, the users/parties need to be registered/enrolled for an account with the carrier/transporter for transportation and logistics services. In other examples, registration with other entities may be required. For any users/parties not properly registered/enrolled, an appropriate computing entity (e.g., carrier/transporter computing entity 100, user computing entity 110, payment computing entity 115, retailer computing entity 120, social media computing entity 125, mobile entity communications network) can require proper enrollment/registration to carry out the one or more actions corresponding to the one or more action identifiers (Block 430 of FIG. 4B). For example, an appropriate computing entity can provide a message or link or request information/data to assist in registering/enrolling each user if necessary. The registration/enrollment may be a full registration/enrollment (e.g., complete registration/enrollment) or a lite registration/enrollment (e.g., partial registration/enrollment) using information/data known about or collected/obtained from the users/parties. As previously described, in other embodiments, users/parties do not necessarily need to be registered/enrolled with any particular entity. In such embodiments, information/data about the users/parties may be available from previous pickups or deliveries from the users/parties, previous histories and/or interactions with the users, and/or the like.

In one embodiment, with the identities of the users/parties determined/identified and the users/parties properly registered/enrolled, an appropriate computing entity (e.g., carrier/transporter computing entity 100, user computing entity 110, payment computing entity 115, retailer computing entity 120, social media computing entity 125, mobile entity communications network) can determine whether any action requirements (if applicable) are satisfied or met (Block 440 of FIG. 4B). In this example, the action requirements may require the user/party to order a minimum number of items (e.g., 50 towels), to live in or request delivery in a specific geographic area (e.g., Anytown USA), and/or the like. For instance, social or group buying may only be available for delivery or pick up in Anytown USA to avoid shipping costs and/or to limit or reduce shipping costs. As described above, this may require an appropriate computing entity to resolve any phone numbers, user IDs, and/or the like to the physical locations of the users/parties and/or to their intended delivery locations. Examples of such concepts are described in U.S. Appl. Nos. 61/792,866, 61/793,307, and U.S. 61/734,803, which are hereby incorporated in their entireties by reference. For instance, appropriate computing entity (e.g., carrier computing entity 100, user computing entity 110, payment computing entity 115, retailer computing entity 120, social media computing entity 125, mobile device communications networks) can track multiple purchase requests to determine/identify whether the action requirements are satisfied. For instance, for the purchase by @JohnDoe899, the appropriate computing entity may not complete the purchase transaction until a sufficient number of users/parties in the identified geographic area provide purchase requests. Thus, the appropriate computing entity can track and execute multiple group or social purchases of the advertised items. For instance, an appropriate computing entity may track a group purchases in zip codes 30309, 23855, and 32809 at the same time. And only when the action requirements are satisfied will the appropriate computing entity carry out the purchase for each of the identified users/parties. If any applicable action requirements are not satisfied or met, an appropriate computing entity can provide a notification/message to the users/parties (e.g., senders and/or intended recipients) of the same. For example, if John user (e.g., operating a user computing entity 115) were to attempt to order 30 towels or request delivery to some location other than Anytown USA, an appropriate computing entity could provide a notification/message identifying the purchasing parameters. Similarly, the notification/message may indicate that three other purchases are needed in 20 minutes to carry out or complete the purchase for the users/parties in a given group. As will be recognized, a variety of other approaches and techniques can be used to adapt to various needs and circumstances.

If any applicable action requirements are satisfied or met, an appropriate computing entity (e.g., carrier/transporter computing entity 100, user computing entity 110, payment computing entity 115, retailer computing entity 120, social media computing entity 125, mobile entity communications network) can initiate/trigger the action and provide notifications/messages to the users/parties regarding the same (Blocks 450 and 455 of FIG. 4B). In this example, an appropriate computing entity triggers/initiates the purchase of the towels from the retailer and shipping the towels to Anytown USA using UPS. Initiating/triggering the purchase may include provide a message from which the identities of any purchasing parties can be resolved based on the Twitter IDs, phone numbers, or user IDs. That is, an appropriate computing entity can determine/identify (e.g., resolve) the accounts/profiles for any parties using the Twitter IDs, phone numbers, or user ID. As part of initiating/triggering the purchase of the towels, an appropriate computing entity can initiate/trigger payment for the towels and the transfer of the requisite funds to any appropriate entities/parties (e.g., retailers, carriers/transporters, shippers). For example, an appropriate computing entity may charge each user's/party's credit card or account of the group and/or transfer the funds to the retailer's account (with or without a service fee). As will be recognized, this may include the carrier/transporter warehousing goods for retailers and packaging, shipping, and transporting the goods. In such a case, the carrier/transporter can perform many or all of the actions of a retailer.

An appropriate computing entity can also provide a message to the carrier/transporter computing entity 100 of the sales/purchase transactions for the group. The carrier/transporter computing entity 100 can identify the accounts/profiles for users/parties of the sales/purchase transactions and generate/create item/shipment records for the same using the Twitter IDs, phone numbers, user IDs, and/or the like. The carrier/transporter computing entity 100 can then automatically generate/create labels to be applied to the exterior of the items/shipments. However, as previously described, the items/shipments can be tendered to the carrier/transporter with or without labels (see FIGS. 16A, 16B, 16C, and 16D). The group or social purchase may be transported to individual delivery locations and/or a common delivery location for pick up by the various users/parties.

In one embodiment, an appropriate computing entity (e.g., carrier/transporter computing entity 100, user computing entity 110, payment computing entity 115, retailer computing entity 120, social media computing entity 125, mobile device communications networks) can provide confirmation messages/notifications for the sales/purchase transactions (Block 455 of FIG. 4B). As will be recognized, the messages/notifications can include various advertisements as described previously. Such confirmation messages/notifications can provided in a variety of ways. For example, as shown in FIG. 30, an appropriate computing entity can provide an electronic message/notification in the user's Twitter timeline that the sales/purchase transaction was completed. In the group or social context, each user may be provided with a unique message or a common group message. As will be recognized, a variety of other approaches and techniques can be used to adapt to various needs and circumstances.

d. Other Uses

As will be recognized and has been previously described, various other examples of using action identifiers are contemplated by embodiments of the present invention. For instance, (1) #UPSPackage and *UPSPackage can be used to trigger/initiate determining/identifying and/or providing the status of an item using UPS, (2) #UPSDriver and *UPSDriver can be used to trigger/initiate determining/ identifying and/or providing the status of the driver delivering an item using UPS, (3) #UPSVehicle, *UPSVehicle, #UPSCar, and *UPSCar can be used to trigger/initiate determining/identifying and/or providing the location of the vehicle or car delivering an item using UPS, (4) #UPSNDA and *UPSNDA can be used to trigger/initiate changing the delivery service level of an item to Next Day Air, (5) #UPS2DA, *UPS2DA, #UPSGND, and *UPSGND can be used to trigger/initiate changing the delivery service levels, (6) #UPSRedelivery and * UPSRedelivery can be used to trigger/initiate attempting redelivery of an item, (7) #Advertising can be used trigger/initiate providing advertising, (8) #Geo can be used to trigger/initiate determining/identifying the location of users/parties, and/or the like. As will be recognized, a variety of other approaches and techniques can be used to adapt to various needs and circumstances.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for generating an electronic shipping record based at least in part on a machine-readable action identifier in an electronic social media message, the method comprising:
    receiving, by a server system, a transmission comprising an electronic social media message, wherein (a) the electronic social media message comprises a sender identifier associated with a sender of the electronic social media message, (b) the transmission originates from a web-based social network comprising a social structure that (i) represents a network of a plurality of users and (ii) comprises connections between the plurality of users, and (c) the plurality of users comprises the sender;
    analyzing, by the server system, the electronic social media message to determine whether the electronic social media message comprises a machine-readable action identifier initiating the purchase of an item by the sender of the electronic social media message;
    responsive to determining that the electronic social media message comprises the machine-readable action identifier initiating the purchase of an item by the sender of the electronic social media message based at least in part on analyzing the electronic social media message, determining, by the server system based at least in part on the sender identifier, whether the sender identifier corresponds to an electronic profile indicating that the sender has been registered with the server system;
    responsive to determining that the sender identifier corresponds to an electronic profile indicating that the sender has been registered with the server system, identifying, by the server system based at least in part on the sender identifier, a physical address stored in the electronic profile corresponding to the sender identifier;
    responsive to determining, by the server, that the sender identifier does not correspond to an electronic profile indicating that the sender has been registered with the server system, providing an interface for the sender to register with the server system;
    identifying, by the server system, the item being purchased; and
    automatically generating, by the server system, an electronic shipping record for the item, comprising automatically populating a ship to address with the physical address stored in the electronic profile and storing the electronic shipping record in a shipping record database; and
    automatically generating, by the server system, a shipment label configured to be printed and affixed to a shipment comprising the item, the shipment label corresponding to the electronic shipment record.

2. The method of claim 1 further comprising:
    determining whether an action requirement corresponding to the machine-readable action identifier must be satisfied to initiate the purchase of an item by the sender of the electronic social media message; and
    responsive to determining that the action requirement corresponding to the machine-readable action identifier must be satisfied, determining whether the action requirement is satisfied.

3. The method of claim 1 further comprising providing (a) a notification to the sender of the electronic social media message and (b) a notification to a selling party of the item.

4. The method of claim 3 further comprising providing an electronic advertisement in the notification to the sender of the electronic social media message.

5. The method of claim 1, wherein the machine-readable action identifier comprises one or more alphanumeric characters.

6. The method of claim 1, wherein the electronic social media message is selected from the group consisted of an email message, a text-based message, a social media message, a picture message, a graphic message, and a video message.

7. The method of claim 1, wherein the method further comprises:
    responsive to determining that the sender identifier corresponds to an electronic profile indicating that the sender has been registered with the server system, identifying, by the server system based at least in part on the sender identifier, a default shipping service level stored in the electronic profile corresponding to the sender identifier; and
    populating the electronic shipping record for the item with the default shipping service level stored in the electronic profile.

8. A server system for generating an electronic shipping record based at least in part on a machine-readable action identifier in an electronic social media message, the server system comprising at least one processor and at least one memory including program code, the at least one memory and the program code configured to, with the processor, cause the server system to at least:

receive a transmission comprising an electronic social media message, wherein (a) the electronic social media message comprises a sender identifier associated with a sender of the electronic social media message, (b) the transmission originates from a web-based social network comprising a social structure that (i) represents a network of a plurality of users and (ii) comprises connections between the plurality of users, and (c) the plurality of users comprises the sender;

analyze the electronic social media message to determine whether the electronic social media message comprises a machine-readable action identifier initiating the purchase of an item by the sender of the electronic social media message;

responsive to determining that the electronic social media message comprises the machine-readable action identifier initiating the purchase of an item by the sender of the electronic social media message based at least in part on analyzing the electronic social media message, determine, based at least in part on the sender identifier, whether the sender identifier corresponds to an electronic profile indicating that the sender has been registered with the server system;

responsive to determining that the sender identifier corresponds to an electronic profile indicating that the sender has been registered with the server system, identify, based at least in part on the sender identifier, a physical address stored in the electronic profile corresponding to the sender identifier;

responsive to determining that the sender identifier does not correspond to an electronic profile indicating that the sender has been registered with the server system, provide an interface for the sender to register with the server system;

identify the item being purchased;

automatically generate an electronic shipping record for the item, comprising automatically populating a ship to address with the physical address stored in the electronic profile and storing the electronic shipping record in a shipping record database; and automatically generating a shipment label configured to be printed and affixed to a shipment comprising the item, the shipment label corresponding to the electronic shipment record.

9. The server system of claim 8, wherein the memory and program code are further configured to, with the processor, cause the server system to:

determine whether an action requirement corresponding to the machine-readable action identifier must be satisfied to initiate the purchase of an item by the sender of the electronic social media message; and responsive to determining that the action requirement corresponding to the machine-readable action identifier must be satisfied, determine whether the action requirement is satisfied.

10. The server system of claim 8, wherein the memory and program code are further configured to, with the processor, cause the server system to provide (a) a notification to the sender of the electronic social media message and (b) a notification to a selling party of the item.

11. The server system of claim 10, wherein the memory and program code are further configured to, with the processor, cause the server system to provide an electronic advertisement in the notification to the sender of the electronic social media message.

12. The server system of claim 8, wherein the memory and program code are further configured to, with the processor, cause the server system to:

responsive to determining that the sender identifier corresponds to an electronic profile indicating that the sender has been registered with the server system, identifying, by the server system based at least in part on the sender identifier, a default shipping service level stored in the electronic profile corresponding to the sender identifier; and populating the electronic shipping record for the item with the default shipping service level stored in the electronic profile.

13. The server system of claim 8, wherein the electronic social media message is selected from the group consisted of an email message, a text-based message, a social media message, a picture message, a graphic message, and a video message.

14. The server system of claim 8, wherein the machine-readable action identifier comprises one or more alphanumeric characters.

15. A computer program product for generating an electronic shipping record based at least in part on a machine-readable action identifier in an electronic social media message, the computer program product comprising at least one non-transitory computer-readable storage medium having computer-readable program code portions stored therein, the computer-readable program code portions comprising:

an executable portion configured to receive, by a server system, a transmission comprising an electronic social media message, wherein (a) the electronic social media message comprises a sender identifier associated with a sender of the electronic social media message, (b) the transmission originates from a web-based social network comprising a social structure that (i) represents a network of a plurality of users and (ii) comprises connections between the plurality of users, and (c) the plurality of users comprises the sender;

an executable portion configured to analyze, by the server system, the electronic social media message to determine whether the electronic social media message comprises a machine-readable action identifier initiating the purchase of an item by the sender of the electronic social media message;

an executable portion configured to, responsive to determining that the electronic social media message comprises the machine-readable action identifier initiating the purchase of an item by the sender of the electronic social media message based at least in part on analyzing the electronic social media message, determine, based at least in part on the sender identifier, whether the sender identifier corresponds to an electronic profile indicating that the sender has been registered with the server system;

an executable portion configured to, responsive to determining that the sender identifier corresponds to an electronic profile indicating that the sender has been registered with the server system identify, based at least in part on the sender identifier, a physical address and a default shipping service level stored in the electronic profile corresponding to the sender identifier;

an executable portion configured to, responsive to determining that the sender identifier does not correspond to an electronic profile indicating that the sender has been registered with the server system, provide an interface for the sender to register with the server system;

an executable portion configured to identify, by the server system, the item being purchased;

an executable portion configured to automatically generate, by the server system, an electronic shipping record for the item, wherein (a) generating the electronic shipping record comprises automatically populating (i) a ship to address with the physical address stored in the electronic profile and (ii) the default shipping service level stored in the electronic profile and (b) the electronic shipping record is stored in a shipping record database; and an executable portion configured to automatically generate, by the server system, a shipment label configured to be printed and affixed to a shipment comprising the item, the shipment label corresponding to the electronic shipment record.

16. The computer program product of claim 15, further comprising:

an executable portion configured to determine whether an action requirement corresponding to the machine-readable action identifier must be satisfied to initiate the purchase of an item by the sender of the electronic social media message; and an executable portion configured to, responsive to determining that the action requirement corresponding to the machine-readable action identifier must be satisfied, determine whether the action requirement is satisfied.

17. The computer program product of claim 15 further comprising an executable portion configured to provide (a) a notification to the sender of the electronic social media message and (b) a notification to a selling party of the item.

18. The computer program product of claim 17 further comprising an executable portion configured to provide an electronic advertisement in the notification to the sender of the electronic social media message.

19. The computer program product of claim 15, wherein the machine-readable action identifier comprises one or more alphanumeric characters.

20. The computer program product of claim 15, wherein the electronic social media message is selected from the group consisted of an email message, a text-based message, a social media message, a picture message, a graphic message, and a video message.

* * * * *